(12) United States Patent
Kose et al.

(10) Patent No.: US 9,748,837 B1
(45) Date of Patent: *Aug. 29, 2017

(54) TIME DELAYED CONVERTER RESHUFFLING

(71) Applicant: UNIVERSITY OF SOUTH FLORIDA, Tampa, FL (US)

(72) Inventors: Selcuk Kose, Tampa, FL (US); Orhun Aras Uzun, Tampa, FL (US); Weize Yu, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/811,033

(22) Filed: Jul. 28, 2015

Related U.S. Application Data

(63) Continuation-in-part of application No. 14/788,027, filed on Jun. 30, 2015.

(60) Provisional application No. 62/051,618, filed on Sep. 17, 2014, provisional application No. 62/165,452, filed on May 22, 2015.

(51) Int. Cl.
    *H02M 3/158* (2006.01)
    *H02M 3/07* (2006.01)

(52) U.S. Cl.
    CPC .................... *H02M 3/07* (2013.01)

(58) Field of Classification Search
    CPC ........ H02M 3/07; H02M 3/156–3/158; H02M 3/1584; H02M 2003/072; G05F 1/56; G05F 1/573; G05F 1/575; G05F 1/5735; G06G 7/1865; H02J 7/0065
    USPC ................ 323/265–282; 363/54, 59, 65, 71; 327/337, 341, 342, 354, 355, 554, 581
    See application file for complete search history.

(56) References Cited

U.S. PATENT DOCUMENTS

| | | | | |
|---|---|---|---|---|
| 5,964,884 | A  * | 10/1999 | Partovi | G06F 12/1054 711/167 |
| 7,907,429 | B2 * | 3/2011 | Ramadass | H02M 3/07 307/110 |

(Continued)

OTHER PUBLICATIONS

Andersen et al., A 4.6 W/mm2 Power Density 86% Efficiency On-Chip Switched Capacitor DC-DC Converter in 32nm SOI CMOS, IEEE Jan. 2013.

(Continued)

*Primary Examiner* — Yemane Mehari
(74) *Attorney, Agent, or Firm* — Thomas Horstemeyer, LLP; David R. Risley; Jason M. Perilla

(57) ABSTRACT

Dynamic power management techniques and voltage converter architectures are described to provide a secure and efficient on-chip power delivery system. In aspects of the embodiments, converter-gating is used to adaptively turn individual interleaved switched-capacitor stages of a voltage converter on and off based on workload information to improve voltage conversion efficiency. Further, as a countermeasure against machine learning based differential power analysis attacks, for example, control signals provided to a number of the interleaved switched-capacitor stages are delayed to reduce the risk of low power trace entropy (PTE). A higher PTE value is maintained regardless of the phase difference between an attacker's sampling rate and the operating frequency, providing an additional layer of security.

20 Claims, 18 Drawing Sheets

(56) References Cited

U.S. PATENT DOCUMENTS

| | | | |
|---|---|---|---|
| 8,089,788 B2 | 1/2012 | Jain | |
| 9,035,626 B2* | 5/2015 | Stratakos | H02J 3/383 323/271 |

OTHER PUBLICATIONS

Baddam et al., Evaluation of Dynamic Voltage and Frequency Scaling as a Differential Power Analysis Countermeasure, VLSI Design, 2007. Held jointly with 6th International Conference on Embedded Systems., 20th International Conference Jan. 2007.

Juliana Gjanci, On-Chip Voltage Regulation for Power Management in System-on-Chip, Thesis Submitted as partial fulfillment of the requirements for the degree of Master of Science in Electrical and Computer Engineering in the Graduate College of the University of Illinois at Chicago, 2008.

Köpf et al., An Information-Theoretic Model for Adaptive Side-Channel Attacks, CCS '07 Proceedings of the 14th ACM conference on Computer and communications security, Oct. 2007.

Maghrebi et al., Entropy-based Power Attack, Hardware-Oriented Security and Trust (HOST), 2010 IEEE International Symposium, Jun. 2010.

Mangard et al., Power Analysis Attacks, Revealing the Secrets of Smart Cards, Springer US, Springer-Verlag US 2007.

Tan et al., Interleaved Switched-Capacitor Converters with Adaptive Control, in Proc. IEEE Energy Convers. Congr. Expo, Sep. 2010, pp. 1081-1084.

Telandro et al., On-Chip Voltage Regulator Protecting Against Power Analysis Attacks, Circuits and Systems, 2006. MWSCAS '06. 49th IEEE International Midwest Symposium on (vol. 2), Aug. 2006.

Tokunaga et al., Securing Encryption Systems With a Switched Capacitor Current Equalizer, IEEE Journal of Solid-State Circuits, vol. 45, No. 1, Jan. 2010.

Uzun, Converter-Gating: A Power Efficient and Secure On-Chip Power Delivery System, IEEE Journal on Emerging and Selected Topics in Circuits and Systems (vol. 4 , Issue: 2 ), Apr. 2014.

Wu et al., Research on Circuit Level Countermeasures for Differential Power Analysis Attacks, Solid-State and Integrated Circuit Technology (ICSICT), 2012 IEEE 11th International Conference, Oct. 2012.

Yu et al., Leveraging On-Chip Voltage Regulators as a Countermeasure Against Side-Channel Attacks, DAC '15 Proceedings of the 52nd Annual Design Automation Conference, Article No. 115, Jun. 2015.

Yu et al., Time-Delayed Converter-Reshuffling: An Efficient and Secure Power Delivery Architecture, IEEE Embedded Systems Letters (vol. 7 , Issue: 3 ), May 2015.

Yuen-Haw Chang, Variable-Conversion-Ratio Switched-Capacitor-Voltage-Multiplier/Divider DC-DC Converter, IEEE Transactions on Circuits and Systems—I: Regular Papers, vol. 58, No. 8, Aug. 2011.

\* cited by examiner

TIME DELAYED CONVERTER RESHUFFLING

CROSS-REFERENCE TO RELATED APPLICATIONS

This application is a continuation in part of U.S. patent application Ser. No. 14/788,027, filed Jun. 30, 2015, titled "Secure Converter-Gating, Reconfiguration, and Regulation," and claims the benefit of U.S. Provisional Application No. 62/051,618, filed Sep. 17, 2014, and U.S. Provisional Application No. 62/165,452, filed May 22, 2015, the entire content of each of which is hereby incorporated herein by reference.

STATEMENT REGARDING FEDERALLY SPONSORED RESEARCH OR DEVELOPMENT

This invention was made with government support under contract number CCF1350451 awarded by the National Science Foundation. The government has certain rights in the invention.

BACKGROUND

Advancements in the semiconductor industry have enabled the integration of billions of transistors on a single semiconductor. Typically, however, only a fraction of the transistors operate at full voltage or frequency, for example, in order not to exceed the thermal design power (TDP) of the semiconductor. Often, a large number of circuit blocks are either inactive (e.g., dark silicon) or in a reduced-power state (e.g., dim silicon) at any given time to satisfy power and thermal constraints.

Circuits typically enter a reduced power state when the workload is light to save power and reduce the cost of cooling. However, on-chip voltage regulators operate indifferently under varying workload conditions and generally provide optimum efficiency for only a certain amount of output power. Since dynamically changing the design parameters of a voltage regulator under different workloads can be relatively difficult, existing power management techniques suffer from increased voltage conversion losses during idle states when current demand is low.

Another growing concern is the security of information processed or stored in integrated circuits (ICs). Several techniques are used by attackers to obtain secret information or functionality from ICs. For example, a side channel power attack is one non-invasive technique to obtain secret information or identify secret functionality of an IC. In such an attack, the correlation between stored information (or functionality) and the power consumption of the IC is exploited. Various input combinations are typically applied to the IC by an attacker. The correlation among the power consumption profiles for different input patterns is statistically analyzed to solve the secret key or learn the secret functionality.

BRIEF DESCRIPTION OF THE DRAWINGS

For a more complete understanding of the embodiments and the advantages thereof, reference is now made to the following description, in conjunction with the accompanying figures briefly described as follows.

DETAILED DESCRIPTION

Figure 1A:
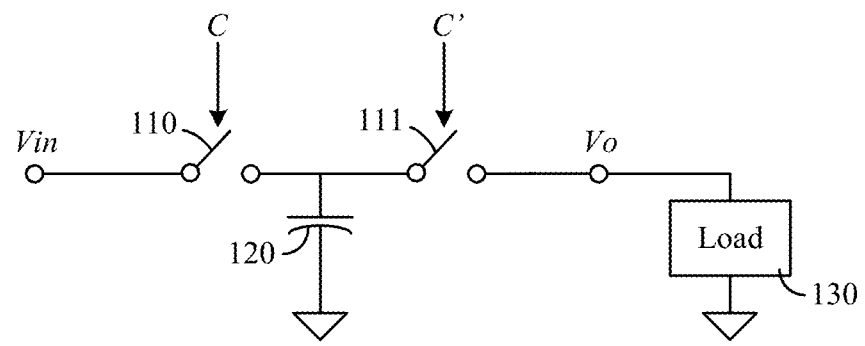
FIG. 1A illustrates an example topology for a 1:1 SC voltage converter according to various aspects of the embodiments.

A significant amount of power may be dissipated during voltage conversion in circuitry for modern mobile platforms, for example. One reason for this power loss is that power delivery networks are designed to satisfy noise requirements under worst-case loading conditions, which is typically at full utilization of computing and memory resources when the current demand is highest.

In the context of efficiency during voltage conversion, the current efficiency of a low-dropout (LDO) regulator increases monotonically with load current when quiescent current is constant. The current efficiency of an LDO regulator also depends on quiescent current consumption. For example, adaptively controlling the quiescent current based on the load current can improve current efficiency. Although the efficiency of an LDO regulator can be improved by adaptively changing the quiescent current, current efficiency is significantly degraded at light load currents.

The power efficiency of a switched-capacitor (SC) converter is not necessarily monotonic, but the maximum efficiency is typically obtained while delivering a certain output current. Often, the power conversion efficiency of a conventional SC converter increases with higher output currents and reduces significantly at low loads. Various techniques can be used to improve the efficiency of conventional SC converters at low load currents, although the power conversion efficiency is usually lower when providing low load currents.

Thus, on-chip voltage regulator topologies often suffer with degraded power conversion efficiencies while providing relatively light or low output currents. When load circuits are in idle or sleeping modes, voltage converters or regulators are typically driven into this low power conversion efficiency region, reducing the overall power conversion efficiency of integrated circuits (ICs). Although significant power savings are achieved at load circuits during reduced power states, these saving can be further boosted if the power delivery system adaptively configures itself based on the workload under a wide range of load currents.

Another performance limiting factor in power delivery is the parasitic impedance of the power grid network between voltage converter and load circuits. When a voltage converter or regulator is implemented off-chip, the parasitic impedance of the off-chip interconnection networks and power/ground pins degrade the power supply integrity by increasing the response time and voltage drops (e.g., due to current times resistance (IR), inductance (Ldi/dt), etc.). Although low-dropout (LDO) regulators provide relatively fast response times, the power conversion efficiency of linear regulators, which can be defined as $$\frac{V_o}{V_{in}},$$

where $V_{in}$ and $V_o$ are, respectively, the input and output voltages, can be limited. To obtain higher power conversion efficiency for a wider range of conversion ratios, switched-capacitor (SC) converters can be used. Further, with technology scaling, high density on-chip capacitors can be realized on-chip. Thus, SC converters with high density on-chip capacitors may achieve relatively higher efficiency than LOD regulators.

Distributed voltage regulation has also gained attention as it can provide relatively faster transient response and lower noise. The parallel integration of LDO regulators, however, may give rise to challenges, such as device mismatches, offset voltages among parallel regulators, overall system stability, and imbalanced current sharing between regulators. On the other hand, for converters such as buck converters, implementing more than one inductor becomes challenging because inductors typically occupy a relatively large area. Further, if the output filter is not distributed, the output voltage provided by a buck converter may have high integrity.

Alternatively, individual stages of an interleaved SC converter may be distributed throughout a power grid without the aforementioned challenges. In interleaved-stage SC converters, each interleaved converter stage operates at a different phase of a clock signal to minimize output voltage ripple. Interleaved SC converters can also reduce filter size and provide higher power efficiency. Unlike in buck converters, filters in interleaved SC converters can be implemented as capacitors that can be easily distributed.

LDO regulators provide a simple solution for on-chip power delivery. However, the linear relationship between input and output currents is a primary problem of utilizing on-chip LDO regulators for secure applications. Due to this characteristic, LDO regulators typically leak a great amount of power consumption information to attackers if no techniques are employed to mask the power consumption. Side channel attacks (SCAs), for example, are non-invasive attacks that can be used to obtain a secret key in a cryptographic circuit without the need for expensive measurement equipment. Further, a differential power analysis (DPA) attack is a type of SCA that exploits the correlation between leaked power consumption information and the processed or stored data. Although several methods have been proposed as a countermeasure against DPA attacks, significant power overhead is often wasted to minimize such information leakage.

On-chip voltage regulators can be designed, however, to act as a countermeasure to SCAB. For example, a constant overall power consumption profile can be obtained by inserting a certain amount of excess current in addition to actual load current. The sum of the excess current and the actual current is kept constant by scaling the excess current inversely to the actual current. The primary disadvantage of this technique is the huge power loss to maintain constant power consumption, especially when actual load current demand is low. Another technique is to randomize the current and disrupt the correlation between the overall power consumption and load current consumption. Power profile scrambling techniques have been proposed to change the amplitude and frequency input current spikes. All of these mitigation techniques increase the overall power consumption and therefore degrade overall system performance.

Conventional SC voltage converters are composed of multiple switches, a capacitor network, and related feedback circuits. A clock signal is used to control the switches through which the capacitors are charged to certain voltage levels based on the converter topology and pulse width of the clock period. Another group of switches, controlled by a complementary non-overlapping clock signal, connects the capacitor to the output node to deliver the stored charge. The charge transfer ratio, and thus the ideal voltage conversion ratio, is determined by the SC converter topology. To generate a wide range of output voltages, SC converters with configurable topologies can be used. Various output voltage levels may be generated by controlling the amount of charge stored in the flying capacitor network with pulse width modulation, frequency modulation, or capacitance modulation.

A 1:1 SC voltage converter is illustrated in FIG. 1A. The converter includes two switches 110 and 112 driven, respectively, by complementary switching control signals C and C', and a flying capacitor 120. The switches 110 and 111 can be embodied as any type of electrically-actuated switch, such as any type of field-effect or other transistor, and the flying capacitor 120 can be embodied as any type of capacitor, such as any type of discrete or integrated (e.g., metal-oxide-semiconductor (MOS)) capacitor, regardless of available capacitance. The converter converts an input voltage Vin to an output voltage Vo. The operation of the converter proceeds in two phases, phase 1 (PH1) and phase 2 (PH2). During PH1, the switch 110 is closed, the switch 111 is open, and the flying capacitor 120 is charged to Vin. During PH2, the switch 110 is open, the switch 111 is closed, and the flying capacitor 120 is discharged to the output load 180, providing 1:1 voltage conversion.

Figure 1B:
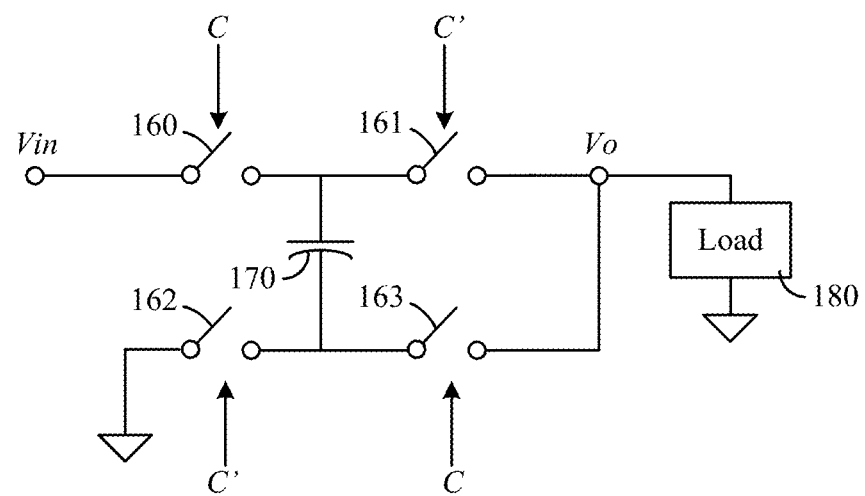
FIG. 1B illustrates an example topology for a 2:1 SC voltage converter according to various aspects of the embodiments.

A 2:1 SC voltage converter is illustrated in FIG. 1B. The converter includes four switches 160-163 driven by switching control signals C and C', and a flying capacitor 170. The switches 160-163 can be embodied as any type of electrically-actuated switch, such as any type of field-effect or other transistor, and the flying capacitor 120 can be embodied as any type of capacitor, such as any type of discrete or integrated (e.g., metal-oxide-semiconductor (MOS)) capacitor, regardless of available capacitance. In the configuration shown in FIG. 1B, the flying capacitor 170 is charged to Vin−Vo, forcing the output to settle at Vin/2. An ideal 2:1 SC converter can provide 100% efficiency when the output voltage Vo is Vin/2 at no load. When a finite amount of current is provided to the output load 180, the output voltage Vo is reduced, reducing the power efficiency of the converter. The operation of the converter also proceeds in two phases, phase 1 (PH1) and phase 2 (PH2). During PH1, the switches 160 and 163 are closed, the switches 161 and 162 are open, and the flying capacitor 120 is charged to Vin-Vo. During PH2, the switches 160 and 163 are open, the switches 161 and 162 are closed, and the flying capacitor 170 is discharged to the output load 180, providing 2:1 voltage conversion.

The power efficiency of an SC converter can be modeled as being limited to $V_o/nV_{in}$, where n is the voltage conversion ratio. This topology related power efficiency limitation has motivated the design of configurable SC converters that can support multiple topologies with a single design to provide high power efficiency over a wide input and output voltage range. Other than the topology-based fundamental power efficiency limitations, parasitic losses of SC converters reduce power efficiency. These power loss mechanisms include: 1) switch driving loss, 2) switch buffer loss, 3) parasitic losses, and 4) control and reference losses.

Switch Driving Loss: As noted above, the switches within an SC converter may be implemented with field-effect transistors, such as metal-oxide-semiconductor (MOS) transistors. An amount of power is dissipated when such switches turn on and off. The power dissipated during the switching activity increases with frequency and switch size. Since SC converters having smaller flying capacitors require smaller switches, the switch driving loss is lower for SC converters with smaller flying capacitors.

Switch Buffer Loss: When the flying capacitor and switches are large, a series of buffers may be used to drive individual switches. The switch buffer loss is the power consumed by these buffers. Buffer loss becomes important when the switch sizes increase and therefore must be included in the efficiency analysis. The power dissipated by the buffers exhibits a similar behavior with the switching power loss and increases with the switching frequency and flying capacitor size.

Parasitic Capacitance Losses: A significant amount of power is used to charge and discharge the parasitic capacitance of the flying capacitor and switches in SC converters. The main contributor of this power loss is the bottom plate capacitance of the flying capacitor. For example, in a 2:1 SC converter, the bottom plate of the flying capacitor is charged to $V_o$ during charging phase and is discharged to ground during the charge transfer phase. In other words, a relatively large parasitic capacitor is charged and discharged at every cycle, reducing the overall power conversion efficiency. The power loss due to parasitic capacitance scales with the size of flying capacitance and switching frequency.

Control and Reference Losses: Another loss mechanism is the power dissipated within the related control and reference circuits. A finite amount of power is consumed to: i) generate the reference voltage, ii) compare the output voltage with reference to provide feedback, and iii) generate the feedback signal. The control and reference circuit related power losses can be considered constant over a wide current range with little or no dependence on output voltage or output current.

Figure 2:
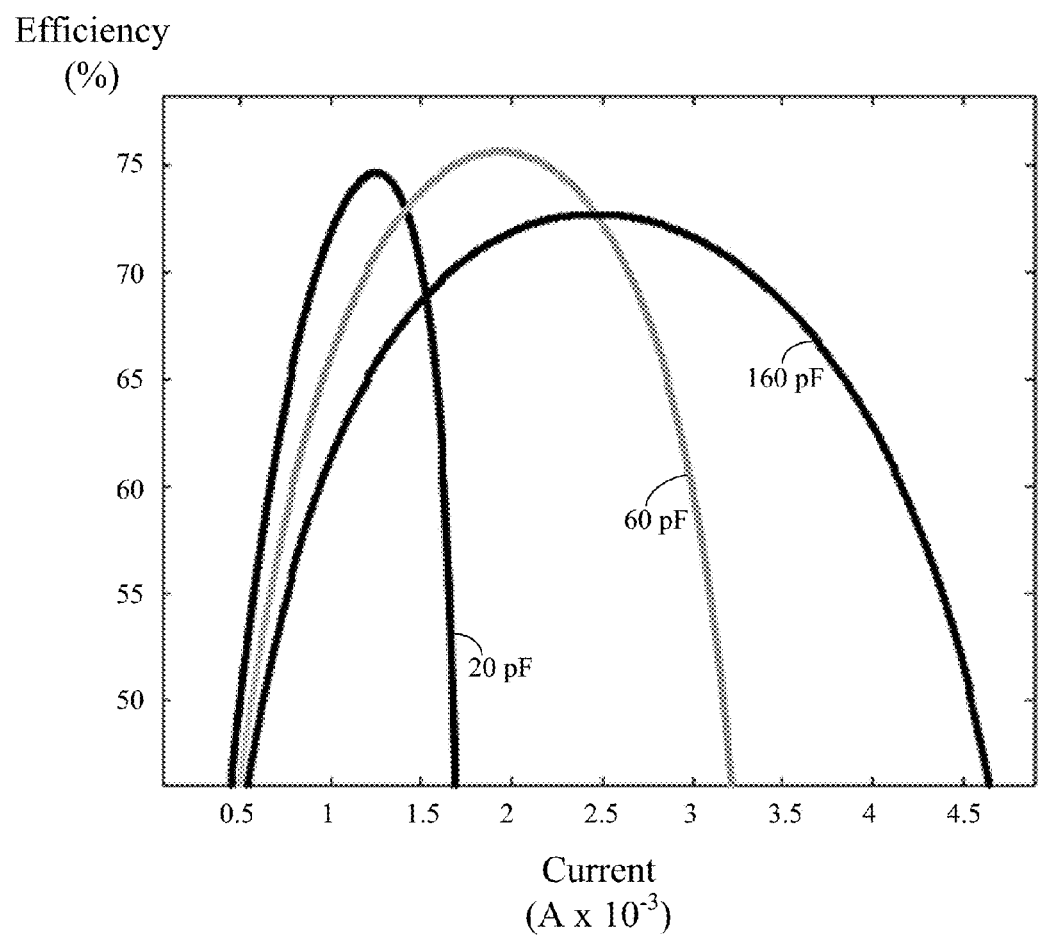
FIG. 2 illustrates example power conversion efficiencies of SC voltage converters having different flying capacitor values according to aspects of the embodiments.

Further, in view of the power efficiency factors described above, the power efficiency of an SC voltage converter can vary based upon the capacity of the flying capacitor used in the converter and the output load current being supplied. In that context, FIG. 2 illustrates example power conversion efficiencies of SC voltage converters having different flying capacitor values according to aspects of the embodiments. Particularly, FIG. 2 illustrates example power conversion efficiencies for SC voltage converters having flying capacitors of 20 pF, 60 pF, and 160 pF and outputting load current ranges between about 0.1 mA to 5 mA. It can be appreciated from FIG. 2 that SC converters with different flying capacitor values have different maximum power efficiencies under different load currents. For example, an SC converter having a smaller flying capacitor can provide higher power efficiency when its load current is low, because among other factors, the drivers and buffers used in the converter are smaller. Alternatively, an SC converter with a larger flying capacitor can provide higher power efficiency under a larger load current. A relatively flat power efficiency curve can be approximated if the size of the SC converter is adaptively modified based on the workload.

Finally, it is noted that SC voltage converters typically utilize one or more of frequency modulation, capacitance modulation, or pulse width modulation to provide a constant output voltage under transient load currents. However, these control techniques do not guarantee high power efficiency when the load current is low. At low load currents, the power efficiency is degraded since the power dissipated in the control circuitry and parasitic impedances becomes significantly higher as compared to the load current.

Considering the factors described above, new SC voltage converter embodiments and architectures are described herein. Based on the observations that smaller SC converters are relatively more efficient at lower load currents, whereas larger SC converters are relatively more power efficient at higher load currents, new converter-gating techniques and embodiments are described herein. In the new converters, individual, phase-interleaved SC stages are activated and inactivated (e.g., turned on and off) based on load current demand to provide a granular level of capacitance modulation as a coarse control technique. Frequency, phase, or another type of switched modulation is also used as a fine control technique to regulate the output voltage between capacitance steps. This approach increases the power conversion efficiency of the converter by having each SC stage operate at relatively high power efficiency. The voltage converter control technique described herein therefore achieves relatively high power efficiency as compared to the existing techniques which typically employ either capacitance or frequency modulation.

In other aspects, control logic of the converter reconfigures one or more SC stages to increase a charge transfer ratio of the converter and/or to provide a decoupling capacitor at the output of the converter. Reconfiguring the SC stages provides faster transient response times as compared to conventional SC converters and/or lower output ripple. Further, an efficient countermeasure for side channel power attacks is also described. Using this countermeasure, the correlation between internal logic operations and the overall power consumption of an IC is significantly disrupted using randomized converter-gating. Thus, the embodiments reduce the dependence or correlation between input and load currents. As such, the input current is no longer linearly dependent on the load current. The correlation between the input current and load current is reduced, in part, by reconfiguring the active phases within an SC voltage converter.

In still other aspects, the interleaved SC stages of the converter can be distributed throughout a power grid of an IC to act as local voltage converters. Distributing individual converter stages reduces the parasitic impedance between the converter and load circuits and therefore reduces voltage drops. Additionally, the response time of converter to transient load change is improved due to reduced power grid parasitic impedance between the converter and the load.

Figure 3:
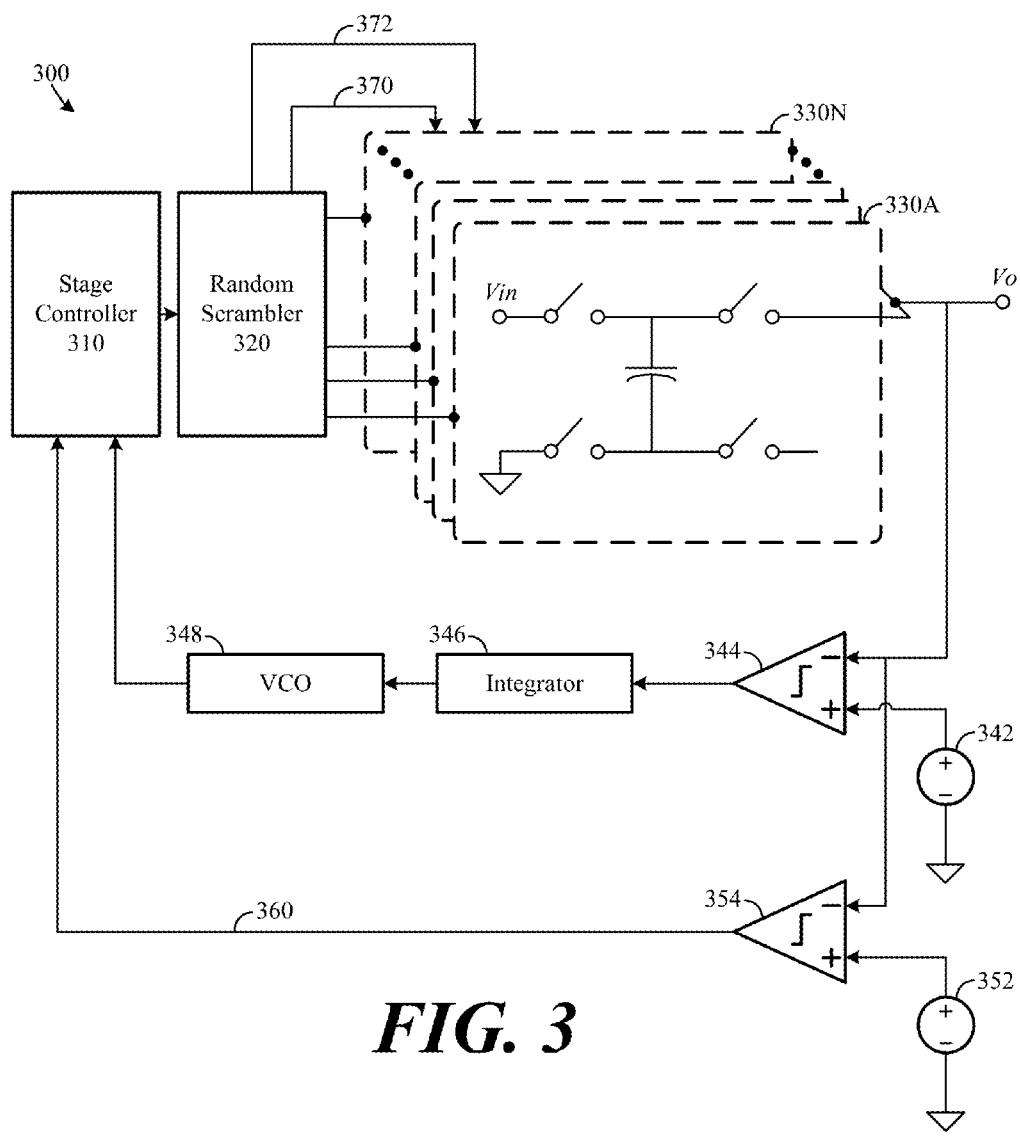
FIG. 3 illustrates an example schematic diagram of a secure converter-gating switched capacitor voltage converter according to aspects of the embodiments.

FIG. 3 illustrates an example schematic diagram of a secure converter-gating switched capacitor voltage converter 300 according to aspects of the embodiments. The converter 300 includes a stage controller 310, a random scrambler 320, and first and second feedback loops. The first feedback loop includes a voltage reference 342, a comparator 344, an integrator 346, and a voltage controlled oscillator (VCO) 348. The second feedback loop includes a voltage reference 352 and a comparator 354. The arrangement of the converter 300 illustrated in FIG. 3 is provided as one example through which the concepts described herein can be achieved. Alternate, modified arrangements, including arrangements having additional components and/or omitting illustrated components, are within scope of the embodiments.

The stage controller 310 and the random scrambler 320 can be each embodied, at least in part, as general- or specific-purpose hardware, software, or any combination thereof. If embodied in dedicated hardware, the stage controller 310 and the random scrambler 320 can be embodied as a circuit, state machine, or logic, for example, in one or any number of technologies. These technologies can include, but are not limited to, discrete logic circuits having logic gates, application specific integrated circuits (ASICs), field-programmable gate arrays (FPGAs), or other components, logic arrays, or any combination thereof. As noted above, the stage controller 310 and the random scrambler 320 can also be embodied, at least in part, by software or executable-code components for execution by any general- or specific-purpose processor, processing circuit or circuitry, or any combination thereof. The operation of the stage controller 310 and the random scrambler 320 are described in further detail below.

In the converter 300, each of the SC stages 330A-330N are embodied by an SC stage similar to the 2:1 SC voltage converter illustrated in FIG. 1B. It should be appreciated, however, that each of the SC stages 330A-330N can be embodied as any suitable SC stage consistent with the concepts described herein. In one embodiment, the converter 300 includes eight SC stages 330A-330N, although greater or fewer numbers of stages can be used. In one embodiment, the SC stages 330A-330N are phase-interleaved. Thus, for eight stages, they are driven by switching signals that are phase shifted by 45° with respect to each other. Likewise, if four stages were relied upon, the stages would be driven by switching signals phase shifted by 90° with respect to each other, and, if 16 stages were relied upon, the stages would be driven by switching signals phase shifted by 22.5° with respect to each other. The phase-interleaving of the SC stages 330A-330N helps to reduce output voltage Vo ripple at the output of the converter 300. According to aspects of the embodiments, the stage controller 310 is configured to activate and deactivate one or more of the SC stages 330A-330N over time, based on the output current load. The stage controller 310 can reconfigure one or more of the SC stages 330A-330N to increase a charge transfer ratio and/or to provide decoupling capacitors at the output of the converter 300.

Each of the SC stages 330A-330N can be distributed throughout the power grid of an IC to minimize power noise and enable point-of-load voltage regulation. The physical location of active stages may be important to reduce noise, balance thermal dissipation, and/or reduce voltage drops, for example. Distributing the SC stages 330A-330N can reduce the voltage drop for nodes that would otherwise be far away from the center of the power grid. Further, when a circuit block in an IC enters an idle mode of operation and the total load current reduces, the stage controller 130 can deactivate one or more of the SC stages 330A-330N that are close in proximity to the idle circuit block. Additional efficiency and reduced thermal loss can be achieved in that way. Thus, based on the information provided by local voltage and current sensors, performance counters, and temperature sensors, the stage controller 310 can activate or deactivate one or more of the SC stages 330A-330N based on local power grid needs and/or considerations.

The converter 300 uses two feedback loops to provide control loop feedback signals for stage controller 310. In the first feedback loop, the comparator 344 compares the output voltage Vo with the reference voltage 342. The output of the comparator 344 is integrated by the integrator 346, which can be embodied as an active and/or passive integrator or integrator array to create the control voltage for the VCO 348. The VCO 348 can be embodied as any suitable VCO that generates a control frequency or other type of signal, and can be realized as a current limited inverter chain in one embodiment. Thus, the first feedback loop effectively samples the output voltage Vo of the converter 500 and provides a control signal representative of the output voltage Vo. The control signal from the VCO 348 is provided as input to the stage controller 310 as a reference to determine the number of active stages needed to supply and regulate power at a desired output voltage Vo.

In the second feedback loop, the second comparator 354 detects transient load changes that would result in more than a threshold voltage drop (e.g., 30 mV, 60 mV, 120 mV, etc.) based on the reference voltage 352 or another reference threshold. In that case, an interrupt output signal 360 is generated at the output of the second comparator 354 and provided to the stage controller 310. The interrupt output signal 360 can prompt the stage controller 310 to reconfigure one or more of the SC stages 330A-330N, for at least a certain period of time, to increase the charge transfer ratio of the converter 300 as described below. In that context, a charge transfer reconfiguration signal 370 can be provided from the stage controller 310 to individual ones of the SC stages 330A-330N. The reconfiguration of one or more of the SC stages 330A-330N to provide an increased charge transfer ratio based on the reconfiguration signal 370 is described in further detail below with reference to FIGS. 4 and 5.

In operation, the stage controller 310 is configured to modulate the switching control signals for the SC stages 330A-330N based on the control signal from the first feedback loop. In other words, when demand for current is low, the stage controller 310 can reduce the number or width of the switching control signal pulses for the SC stages 330A-330N. In that way, less charge is transferred from the input Vin to the output Vo. On the other hand, when demand for current is high, the stage controller 310 can increase the number or width of the switching control signal pulses for the SC stages 330A-330N. In that way, more charge is transferred from the input Vin to the output Vo. The stage controller 310 can determine whether demand for current or charge is high based on the current value of the output voltage Vo and how that value changes over time. The control signal from the first feedback loop is representative of how the value of the output voltage Vo changes over time.

Thus, the stage controller 310 can control the output of the SC stages 330A-330N using any suitable modulation technique, such as frequency modulation, pulse width modulation, capacitance modulation, or any combination thereof, to provide a relatively constant output voltage under transient loads. However, these control techniques do not necessarily provide high power efficiency when the demand for load current is low. At low load currents, the power efficiency is degraded, for example, since the power dissipated in the control circuitry and parasitic impedances becomes significantly higher as compared to the load current.

To help increase efficiency when the demand for load current is low, the stage controller 310 is configured to deactivate a subset of the SC stages 330A-330N. Stated differently, the stage controller 310 is configured to determine a number of the SC stages 330A-330N to be activated based on the control signal from the first feedback loop. For example, if the number of the switching control signal pulses for the currently active subset of the SC stages 330A-330N rises toward a first upper limit, it is clear that the active subset is close to its upper limit of charge transfer. Thus, one or more additional ones of the SC stages 330A-330N should be activated. In that context, the stage controller 310 is configured to increase the number of the SC stages 330A-330N to be activated when the control signal switching frequency for the currently active subset of the stages rises above a first frequency. If pulse width modulation is relied upon, the stage controller 310 can increase the number of the SC stages 330A-330N to be activated when the pulse width of the control signals becomes greater than a first width.

On the other hand, if the number of the switching control signal pulses for the currently active subset of the SC stages 330A-330N falls toward to a second lower limit, the active subset is operating relatively inefficiently, at least because the power dissipated in the control circuitry and parasitic impedances of the active subset is relatively high as compared to the load current being supplied. Thus, one or more additional SC stages 330A-330N should be deactivated. In that context, the stage controller 310 is configured to decrease the number of the SC stages 330A-330N to be activated when the control signal switching frequency for the currently active subset of the stages falls below a second frequency. If pulse width modulation is relied upon, the stage controller 310 can decrease the number of the SC stages 330A-330N to be activated when the pulse width of the control signals becomes lower than a second width.

As a more particular example, when the control signal switching frequency, the output of the VCO 348, or the input voltage to the VCO 348, for example, exceeds a first predetermined limit or threshold for more than a number of cycles, at least one more of the SC stages 330A-330N are activated. Alternatively, when the control signal switching frequency, the output of the VCO 348, or the input voltage to the VCO 348, for example, falls below a second predetermined limit or threshold for more than a number of cycles, at least one of the currently active SC stages 330A-330N are deactivated. Depending upon the point of reference, the first and second thresholds can be set in terms of frequency or voltage thresholds. Further, to prevent stages from turning on and off excessively when the feedback signals approach the limit values, hysteresis can be incorporated. For example, a first, upper frequency limit can be selected as 60 MHz and the second, lower frequency limit can be selected as 30 MHz, although the use of other frequency limits are within the scope of the embodiments.

In the proposed control techniques, the activation and deactivation of individual ones of the SC stages 330A-330N is utilized for coarse control, and switching modulation is used for fine control. For example, if the load current demand increases when a certain number of stages are active, the operating frequency can be increased to provide the required load current. If the switching frequency exceeds the first upper threshold, another stage is activated and turns on, which in turn reduces the switching frequency of the other active stages. The 30 MHz and 60 MHz limits, as one example, imply that each converter stage delivers an output current between about 80 uA and about 350 uA in one embodiment. When converter stages are forced to deliver more than about 350 uA, less than about 80 uA, and/or the operating frequency exceeds 60 MHz or goes below 30 MHz, for example, another stage may be turned on or off to keep the operating frequency in the 30 MHz to 60 MHz range, for example.

The random scrambler 320 is configured to randomly adjust an activation pattern for the active subset of the SC stages 330A-330N based on the number of the plurality of switched capacitor stages determined by the stage controller 310 to be activated. In that context, the random scrambler 320 can include a random or pseudo-random number generator. The random scrambler 320 uses this random output to scramble the activation pattern of the SC stages 330A-330N. In other words, if four of the SC stages 330A-330N are to be activated, the random scrambler 320 is configured to randomly change which four of the SC stages 330A-330N are active, over time.

As compared to linear converters, the input current to the converter 300 includes spikes whose amplitude, frequency, and width depends on the activation and switching control signals generated by the stage controller 310. Due to this relationship between input and output current profiles, more time and effort is required to understand the functionality or secret key, for example, in an IC that uses the converter 300 to provide power. The relation between the input and output currents becomes even more complicated when the proposed, randomized converter-gating approach is used. The frequency and amplitude are not linearly correlated with the load current since the frequency and amplitude of the spikes vary adaptively as the number and activation pattern of the active stages change. The input current and power waveforms are more difficult to analyze due to changes in the active number of the SC stages 330A-330N over time, as well as the random changes in the activation pattern of that number of stages.

In one particular example, the activation pattern can be determined, at least in part, with a linear feedback shift register (LFSR)-based 10-bit random or pseudo-random number generator. As a result, random changes and/or delays are applied to the input current waveform and the amplitude of the spikes randomly varies with the activation pattern. For example, when five of eight SC stages 330A-330N are active, the phases of these active stages can be configured as (0°, 45°, 90°, 135° and 180°) or (0°, 90°, 180°, 225°, and 270°) (56 different combinations exist for this case). These different converter-gating activation patterns lead to varying current spikes at the input of the converter 300. Changes in input current to the converter 300 that result from scrambling the activation pattern of the SC stages 330A-330N provides a level of security against attackers that may seek to obtain secret information or functionality based on power consumption. The scrambling helps to minimize the correlation between the input and load current profiles.

Because the stage controller 310 provides phase-interleaved switching control signals to the SC stages 330A-330N in some embodiments, changes in the active subset of the SC stages 330A-330N can impact the output voltage Vo ripple wave shape due to symmetrical and asymmetrical charge transfer timings. To address this, the stage controller 310 can reconfigure one or more of the inactive SC stages 330A-330N to provide a decoupling capacitor at the output of the converter 300. In that context, a decoupling reconfiguration signal 372 can be provided from the stage controller 310 to individual ones of the SC stages 330A-330N. Decoupling reconfiguration is described in further detail below with reference to FIGS. 6-8. In that context, a decoupling reconfiguration signal 372 can be provided from the stage controller 310 to individual ones of the SC stages 330A-330N.

Figure 4:
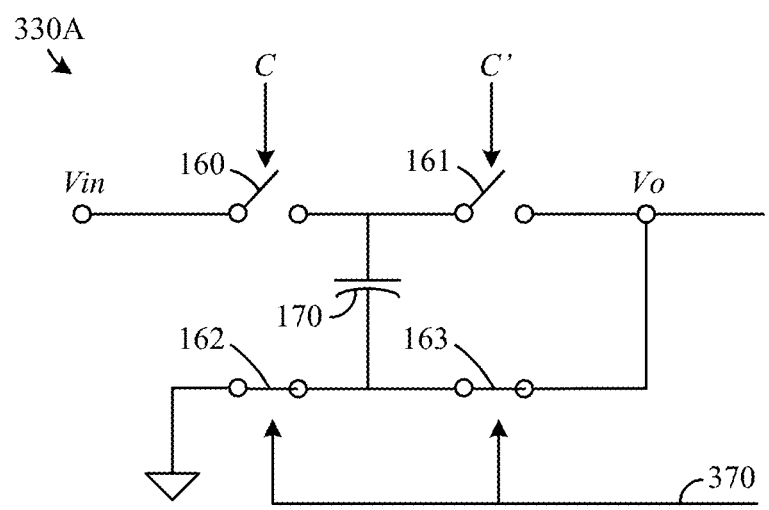
FIG. 4 illustrates an example reconfiguration of a switched capacitor stage in the converter shown in FIG. 3 for increased charge transfer according to aspects of the embodiments.

In FIG. 4, an example reconfiguration of the SC stage 330A is illustrated for increased charge transfer. As noted above, one or more of the SC stages 330A-330N of the converter 300 can be reconfigured to provide an increased charge transfer ratio in response to the charge transfer reconfiguration signal 370 generated by the stage controller 310. That is, if the second comparator 354 of the detects transient load changes that result in more than a threshold voltage drop at the output voltage Vo, the stage controller 310 receives the interrupt output signal 360 and, in response, is configured to increase the charge transfer ratio of the converter 300 by directing one or more of the SC stages 330A-330N to be reconfigured as shown in FIG. 4, for example.

To achieve a fast recovery during either activation or deactivation of individual stages or during a transient voltage drop, it can be helpful to transfer a higher (or lower) amount of charge to the output of the converter 300 for a finite amount of time. A convenient and simple technique to achieve fast response time is configuring a 2:1 SC stage as a 1:1 SC stage during the load transients. During normal operation of a 2:1 SC stage, the flying capacitor is charged to as high as Vin−Vo. Alternatively, if a 1:1 configuration is used, the total charge can be increased by $C_{flying} \times Vo$. By configuring a 2:1 SC converter as a 1:1 SC converter, the total amount of charge transferred is increased in each cycle by nearly a factor of two, significantly reducing the response time.

In the context described above, as shown in FIG. 4, the charge transfer reconfiguration signal 370 directs the switches 162 and 163 in the SC stage 330A to close, effectively overriding the application of the switching control signals C and C' provided to the switches 162 and 163.

Thus, the charge transfer reconfiguration signal 370 effectively reconfigures the SC stage 330A from a 2:1 converter to a 1:1 converter, increasing the charge transfer ratio of the SC stage 330A per unit time. To some extent, using this approach may generate output voltages higher than the desired output voltage, which may cause instability. Therefore, the transient drop threshold voltage can be selected carefully to prevent the converter 300 from generating higher voltages than the desired output voltage even under worst case conditions.

Figure 5:
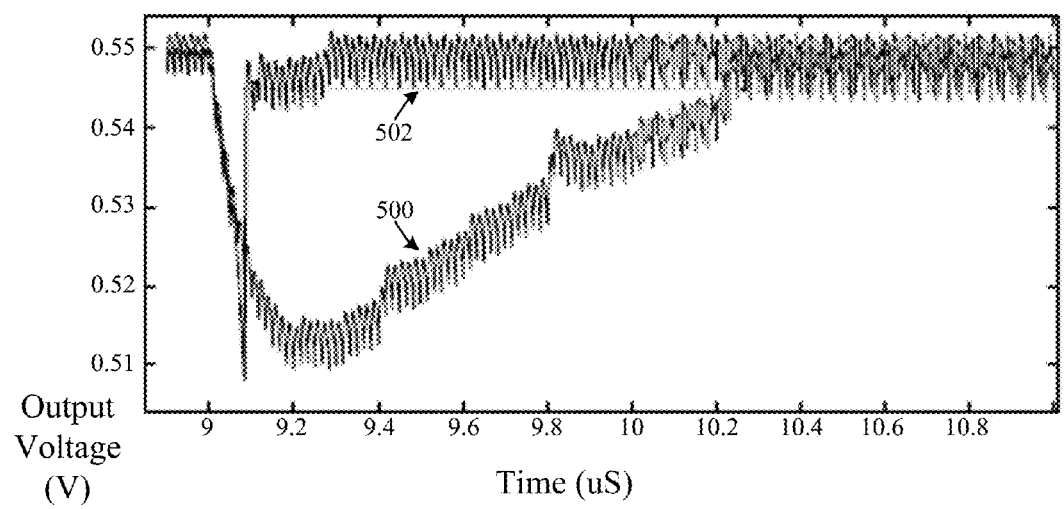
FIG. 5 illustrates an example difference in output voltage recovery after reconfiguration of a switched capacitor stage for increased charge transfer according to aspects of the embodiments.

FIG. 5 illustrates an example difference in output voltage recovery after the reconfiguration of one or more of the SC stages 330A-N for increased charge transfer according to aspects of the embodiments. In FIG. 5, the output voltage recovery waveforms 502 and 500 are shown in an example case where load current increases from 1 mA to 3 mA. The waveform 500 is representative of the case when none of the SC stages 330A-N are reconfigured for increased charge transfer. On the other hand, the waveform 502 is representative of the output voltage recovery when one or more of the SC stages 330A-N are reconfigured as shown in FIG. 4 to an increased ratio of charge transfer. For the waveform 502, when the output voltage falls 30 mV below the desired output voltage of about 550 mV, an interrupt signal is asserted to reconfigure one or more of the SC stages 330A-N from 2:1 to 1:1 stages. In turn, the output voltage recovery response time is improved from about 1.4 us to about 104 ns. In other embodiments, the SC stages 330A-N can be reconfigured in other ways besides 2:1 to 1:1 reconfiguration. For example, alternatively or additionally, the capacitance of the flying capacitor can be increased or decreased.

Figure 6:
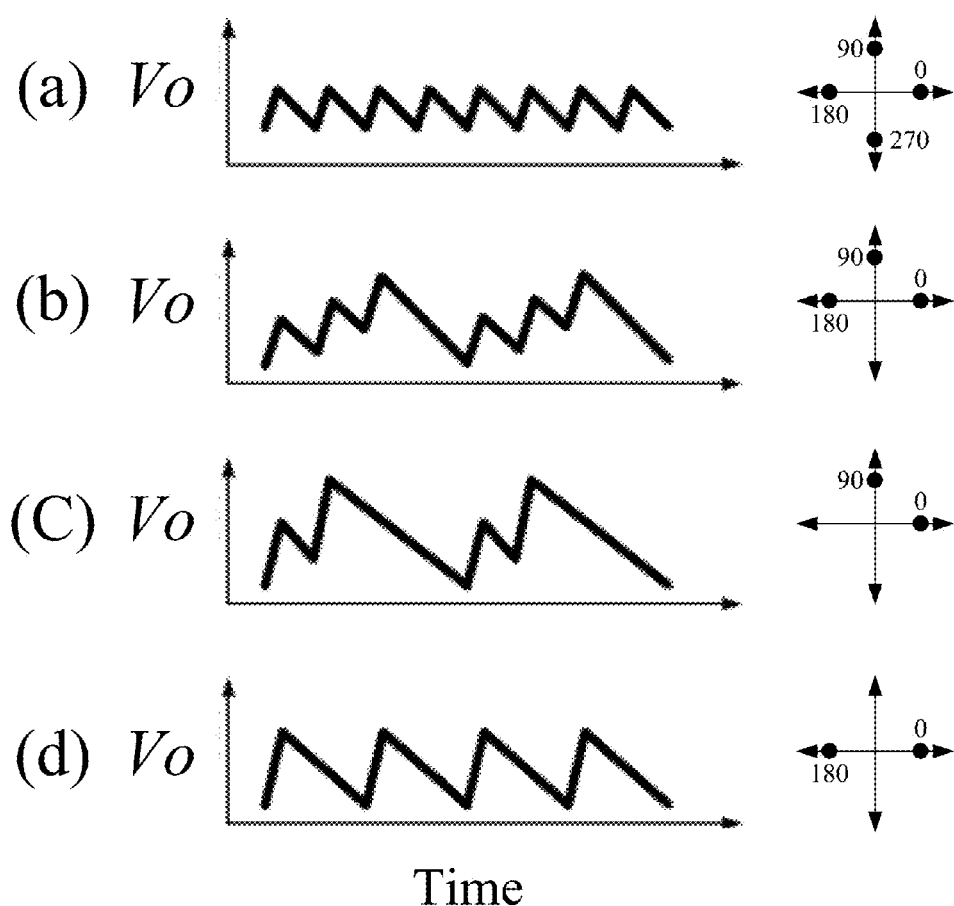
FIG. 6 illustrates output ripple examples for various active phases of the switched capacitor stages in the converter shown in FIG. 3 according to aspects of the embodiments.

Turning to other aspects of the embodiments, when certain ones of the phase-interleaved SC stages 330A-N are activated and deactivated, the output voltage Vo ripple exhibits an asymmetric behavior, as illustrated in FIG. 6 for a four stage interleaved SC converter. When all of the stages are active, the voltage ripple exhibits a symmetric behavior, as shown in (a) in FIG. 6. However, when one of the stages is turned off, the output ripple becomes asymmetric and the amplitude of the ripple increases, as shown in (b) in FIG. 6. When two of the four stages are turned off, there are two cases. If the deactivated two phases are adjacent to each other (i.e., the phase difference is 90°), the output voltage ripple exhibits an asymmetric behavior, as shown in (c) of FIG. 6. In the other case, when the deactivated two phases are symmetric to each other (i.e., the phase difference is 180°), the output voltage ripple exhibits a symmetric behavior, as shown in (d) in FIG. 6.

Figure 7:
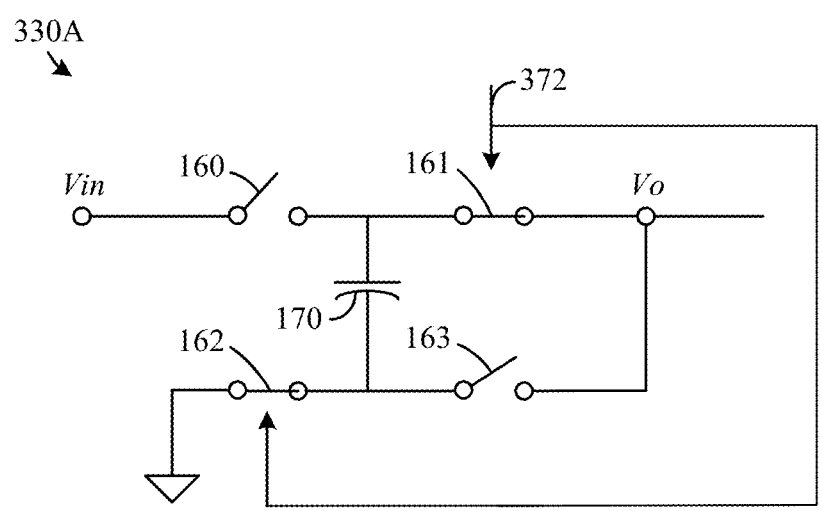
FIG. 7 illustrates an example reconfiguration of an inactive switched capacitor stage to provide a decoupling capacitor at the output of the converter shown in FIG. 3 according to aspects of the embodiments.

To help address this asymmetric behavior, the output voltage Vo ripple of the converter 300 can be reduced by utilizing the flying capacitors in the inactive SC stages 330A-N as decoupling capacitors. FIG. 7 illustrates an example reconfiguration of the SC stage 330A, when inactive, to use the flying capacitor 170 as a decoupling capacitor at the output of the converter 300. Although only SC stage 330A is shown in FIG. 7, one or more inactive ones of the SC stages 330A-330N can be reconfigured to provide a decoupling capacitor at the output of the converter 300. The decoupling reconfiguration signal 372 directs the switches 161 and 162 in the SC stage 330A to close, effectively overriding the application of the switching control signals C and C' provided to the switches 161 and 162 (and, in some embodiments, blocking any control signals to the switches 160 and 163). Thus, the decoupling reconfiguration signal 372 effectively reconfigures the SC stage 330A to use the flying capacitor 170 as a decoupling capacitor at an output of the converter 300.

Figure 8:
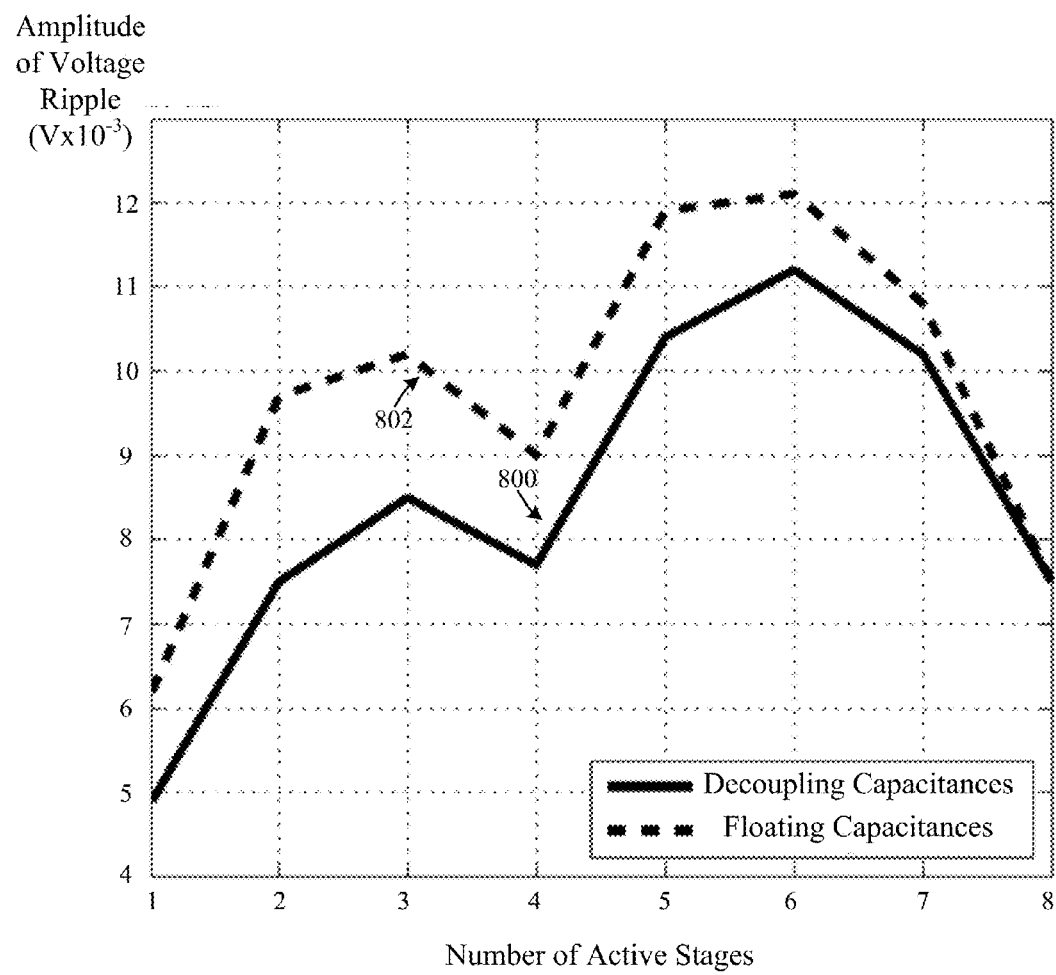
FIG. 8 illustrates example differences in output voltage ripple when configuring inactive switched capacitor stages to provide decoupling capacitors according to aspects of the embodiments.

Using unused flying capacitors in inactive stages as decoupling capacitors may provide up to about 20% reduction, for example, in the output voltage Vo ripple amplitude without consuming any power. FIG. 8 illustrates example differences in output voltage Vo ripple when configuring inactive switched capacitor stages to provide decoupling capacitors. The output voltage Vo ripple of an eight stage interleaved SC voltage converter is shown in FIG. 8, where the solid line 800 shows the output voltage Vo ripple with decoupling capacitance utilization in inactive stages and the dashed line 802 shows the output voltage Vo ripple when the flying capacitances in inactive stages are left floating. The amplitude of the ripple reaches a local minimum when four stages are active because, at this point, the remaining four active stages form a symmetric ripple behavior. Additionally, the amplitude of the voltage ripple reduces: i) when only one stage is active due to the relatively low load current and ii) when all the stages are active, again, due to the symmetric ripple behavior.

Figure 9:
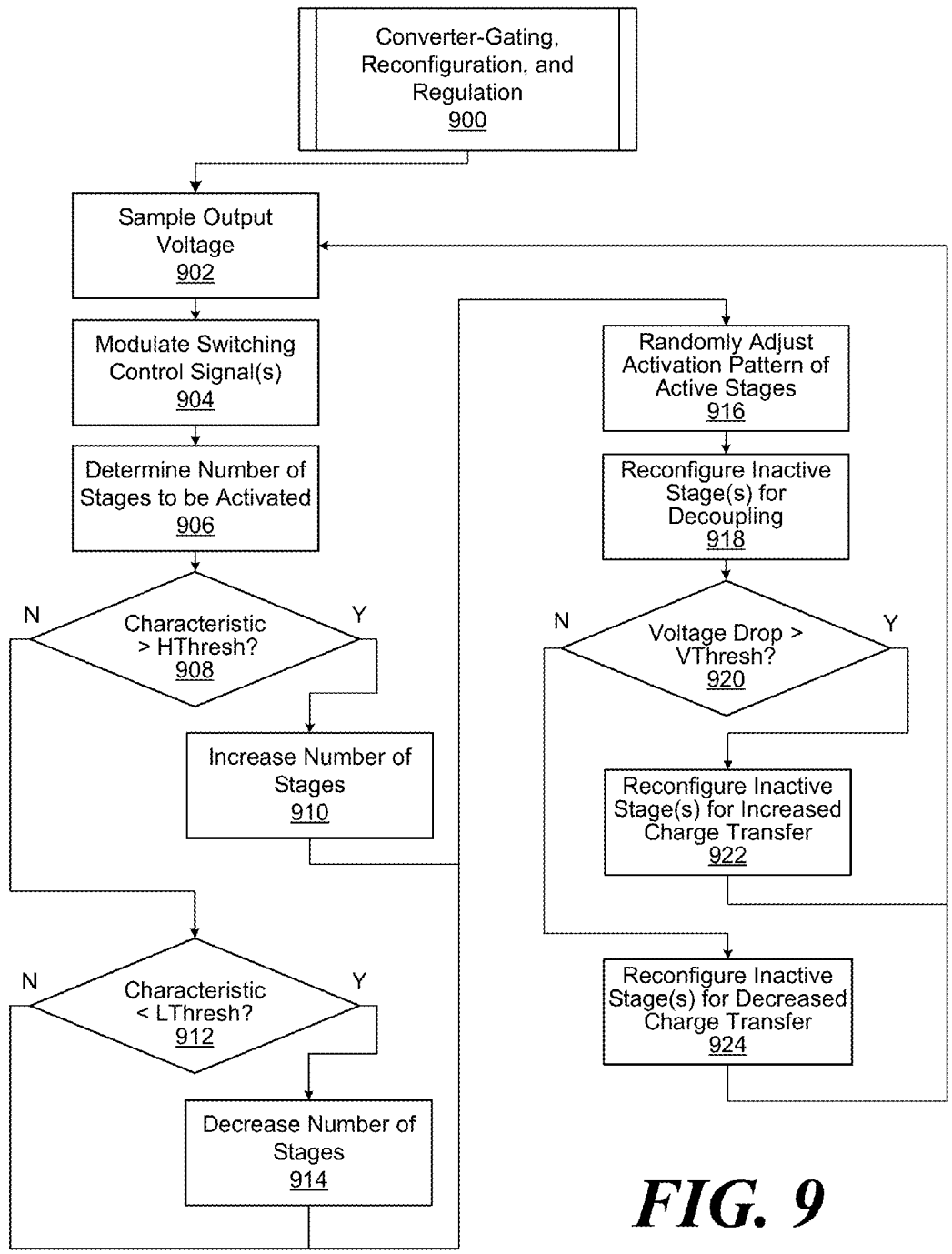
FIG. 9 illustrates an example process for secure converter-gating, reconfiguration, and regulation performed by the converter shown in FIG. 3 according to aspects of the embodiments.

FIG. 9 illustrates an example process 900 for secure converter-gating, reconfiguration, and regulation performed by the converter shown in FIG. 3 according to aspects of the embodiments. It is noted that the process 900 is described below with reference to the converter 300 shown in FIG. 3. However, other switched capacitor voltage converters consistent with the embodiments described herein can perform the process 900.

At step 902, the process 900 includes the converter 300 sampling, through the first feedback loop, the output voltage Vo. For example, as described above, the first feedback loop can provide a signal representative of the output voltage Vo to the stage controller 310. At step 904, the process 900 includes modulating the switching control signals for the SC stages 330A-330N based on the sampled output voltage Vo. Here, as described above, the switching control signals C and C' can be modulated in frequency, pulse width, etc., to achieve a desired output voltage Vo.

At step 906, the process 900 includes the stage controller 310 determining a number of the SC stages 330A-330N to be activated. According to the concepts described herein, the stage controller 310 can determine the number of stages to be active based on one or more operating characteristics of the converter 300, such as the frequency or pulse width of the switching control signals C and C', the output of the VCO 348, etc.

The determination of the number of stages to be active is dynamic and ongoing in the process 900. Thus, at step 908, if certain operating characteristics of the converter 300, such as the frequency or pulse width of the switching control signals C and C', rise above a first threshold HThresh, then the process 900 proceeds to step 910 where the number of the SC stages 330A-330N to be activated is increased. The increase can be by one stage, two stages, or any suitable number of stages. On the other hand, if the operating characteristics do not rise above the first threshold HThresh, then the process 900 proceeds to step 912.

At step 912, if certain operating characteristics of the converter 300, such as the frequency or pulse width of the switching control signals C and C', fall below a second threshold LThresh, then the process 900 proceeds to step 914, where the number of the SC stages 330A-330N to be activated is decreased. The decrease can be by one stage, two stages, or any suitable number of stages. On the other hand, if the operating characteristics do not fall below the second threshold LThresh, then the process 900 proceeds to step 916. Consistent with the concepts described herein, the HThresh and LThresh thresholds can be related to frequency, pulse width, voltage, or other thresholds. Also, the HThresh and LThresh thresholds can be selected to provide a certain level of hysteresis in the control loop of the converter 300.

At step 916, the process 900 includes the random scrambler 320 randomly adjusting an activation pattern for an active subset of the plurality of the SC stages 330A-330N based on the number of the stages to be activated. For example, when five of eight SC stages 330A-330N are active, the phases of these active stages can be configured as (0°, 45°, 90°, 135° and 180°) or (0°, 90°, 180°, 225°, and 270°) (56 different combinations exist for this case). These different converter-gating activation patterns lead to varying current spikes at the input current of the converter 300. Changes in input current to the converter 300 that result from scrambling the activation pattern of the SC stages 330A-330N provide a level of security against attackers that may seek to obtain secret information or functionality based on power consumption. The scrambling helps to minimize the correlation between the input and load current profiles.

At step 918, the process 900 includes the stage controller 310 reconfiguring at least one of the SC stages 330A-330N that is inactive to provide a decoupling capacitor at an output of the converter 300. Consistent with the concepts described herein, the reconfiguring at step 918 can be performed based on the decoupling control signal 372 as described with reference to FIG. 7.

At step 920, the process 900 includes determining whether an output voltage of the converter 300 has dropped by more than a predetermined amount VThresh below the desired output voltage Vo. For example, when the second comparator 354 in FIG. 3 detects transient load changes that result in more than a threshold voltage drop VThresh (e.g., 30 mV, 60 mV, 120 mV, etc.) in the output voltage Vo, the second comparator 357 generates an interrupt output signal 360 and provides it to the stage controller 310. If the drop is greater than the threshold VThresh, the process 900 proceeds to step 922. Otherwise, the process 900 proceeds to step 924.

At step 922, the process 900 includes the stage controller 310 reconfiguring at least one of the SC stages 330A-330N that is active to increase its charge transfer ratio. The charge transfer ratio can be increased by reconfiguring active stages from 2:1 switched capacitor stages to 1:1 switched capacitor stages, as described above with reference to FIG. 4. In that way, the charge transfer ratio of the converter 300 can be increased for at least a limited number of cycles or period of time until the desired output voltage Vo is stabilized.

At step 924, the process 900 includes the stage controller 310 reconfiguring one or more of the active SC stages 330A-330N from 1:1 switched capacitor stages back to 2:1 switched capacitor stages, as described above with reference to FIG. 4. In that way, the output ripple of the converter 300 can be decreased while the demand for load current is constant and/or the output voltage Vo is stabilized.

The embodiments described above provide increased power conversion efficiency for low output currents, for example, with slight modifications to existing on-chip voltage regulation systems, while additional security measures are achieved. With regard to security, since the switching control signals for each of the SC stages 330A-330N is phase-interleaved to have a certain phase shift, the input current profile spikes of the SC stages 330A-330N exhibit varying time shifts. When the random scrambler 320 is used in the converter 300 to randomly reshuffle the positions of the current profile spikes, an additional timing uncertainty is introduced in the power profile of the converter 300.

One drawback of the reshuffling technique is that an attacker may be able to obtain switching frequency and phase information with machine learning attacks. If an attacker can synchronize an attack with the switching frequency fs of the converter 300, the average power within a switching period could leak information to the attacker that may destroy the added security benefit of reshuffling the converter stages.

Thus, to provide additional levels of security and address machine learning-based DPA attacks, for example, additional embodiments are described below. Aspects of the embodiments described below can be combined with the converter 300 described above, for example, or other similar converters. The embodiments incorporate the application of a random delay to the switching control signals for one or more of the SC stages in a converter, while the switching control signals for the remaining SC stages are not delayed. To provide even stronger security against DPA and other types of attacks, this random delay can be applied in place of or in addition to the random reshuffling achieved using the random scrambler 320 described above.

In one embodiment using the time delayed switching control signals, the switching control signals for half the SC stages in a converter are delayed with a certain time shift, eliminating possible synchronization of an attacker's sampling frequency with the switching frequency of the converter. With this technique, the minimum power trace entropy (PTE) value is significantly increased under machine learning attacks, even when the attacker's sampling frequency is in complete synchronization with the converter.

Entropy is commonly used in information theory to model the level of uncertainty (or randomness) in a given data set. In cryptography, entropy is used to evaluate the security performance of integrated systems against SCAs to quantify the security performance of different on-chip voltage converters. The input power of a voltage converter $H_i(t)$, ($i=1, 2, \ldots, k$) can have k different values while delivering the same output power $P_{out}(t)$ to the load circuits depending on the design parameters of the voltage converter and the phase and frequency of the switching control signal. If it is assumed that the probability of having different input power values is $p_i(t)$, ($i=1, 2, \ldots, k$), the input power trace entropy PTE(t) of a voltage converter can then be defined as:

$$PTE(t) = -\sum_{i=1}^{k} p_i(t) \log_2^{p_i(t)}. \quad (1)$$

Primarily, two parameters of an SC converter can leak load power information to attackers, including switching frequency and number of active converter stages. The switching frequency fs has a monotonic relationship with the output power Pout. Thus, in some embodiments, fs can be fixed to eliminate the possible leakage of workload information. Even in that case, the number of active SC stages in a converter increases with the workload and may therefore leak the workload information to the attacker.

Figure 10:
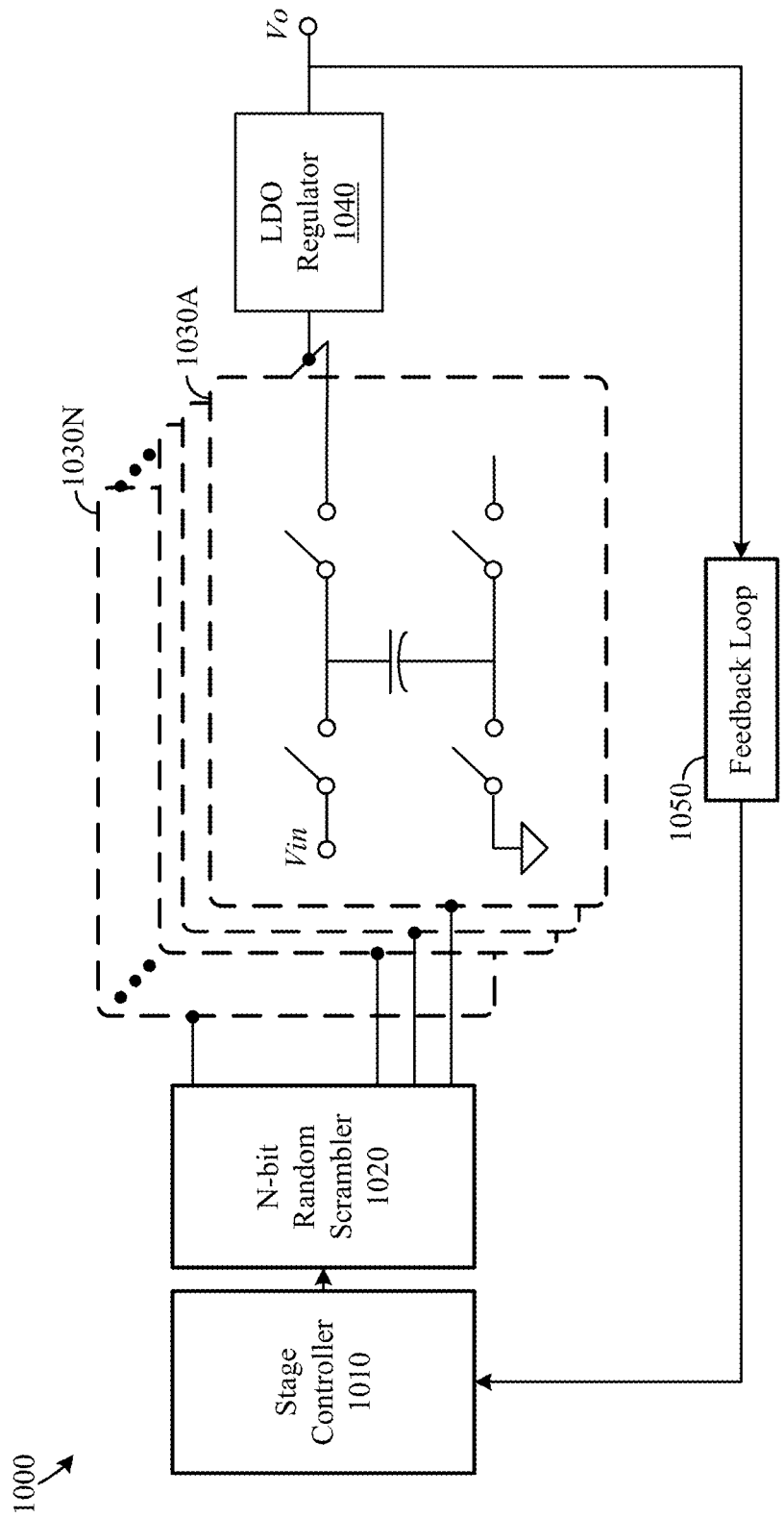
FIG. 10 illustrates an example schematic diagram of another secure, reshuffling converter-gating switched capacitor voltage converter according to aspects of the embodiments.

FIG. 10 illustrates an example schematic diagram of another secure, reshuffling converter-gating SC converter 1000 according to aspects of the embodiments. The converter 1000 includes a stage controller 1010, an N-bit random scrambler 1020, phase-interleaved SC stages 1030A-1030N, an LDO regulator 1040, and a feedback loop 1050. The SC converter 1000 is similar in structure and operation as compared to the SC converter 300 shown in FIG. 3. For example, the stage controller 1010 is similar in structure and operation as compared to the stage controller 310. The N-bit random scrambler 1020 is similar in structure and operation as compared to the random scrambler 320, and can be embodied, at least in part, as a LFSR-based N-bit random or pseudo-random number generator. The SC stages 1030A-1030N are similar in structure and operation as compared to the SC stages 330A-330N. Further, the feedback loop 1050 is similar to and may incorporate one or more aspects of the first and/or second feedback loops of the converter 300.

As an optional difference compared to the converter 300, however, in one embodiment, the stage controller 1010 does not modulate the switching control signals for the SC stages 1030A-1030N based on the control signal from the feedback loop 1050 (e.g., fixed frequency modulation is relied upon). In that case, the output power resolution $N/P_{out}$ at the output of the converter 1000 can be degraded using fixed frequency modulation, especially if the number of phases N is relatively small. In that case, the LDO regulator 1040 can be inserted at the output of the converter 1000 to mitigate the possibility of output DC shift in the output voltage Vo. If the number of phases N is sufficiently large (if switching control signal modulation is used, etc.), the LDO regulator 1040 can be omitted from the converter 1000.

Figure 11:
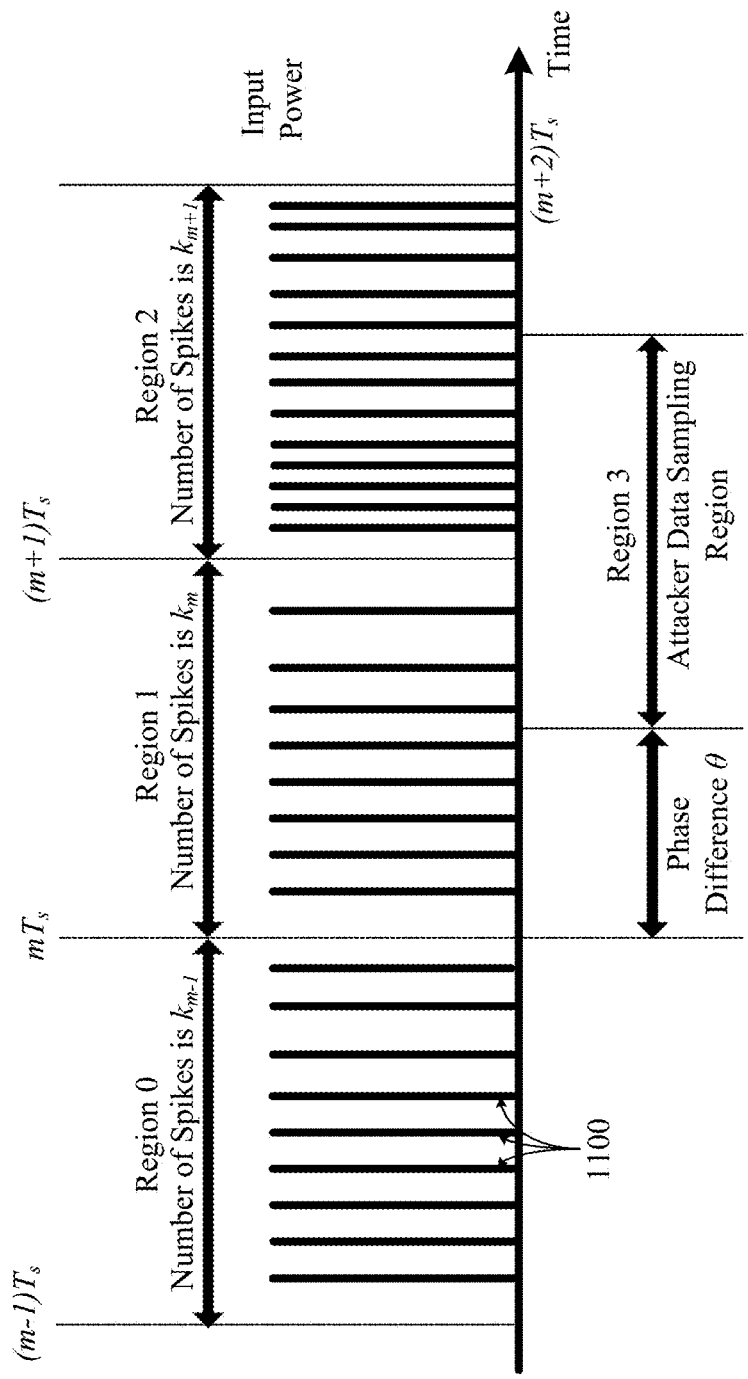
FIG. 11 illustrates an example input power profile to the switched capacitor voltage converter in FIG. 10.

FIG. 11 illustrates an example input power profile to the SC converter 1000 in FIG. 10. Particularly, the input power to the SC converter 1000, which may be monitored by an attacker, is illustrated in FIG. 11. In FIG. 11, Ts is the period of one switching cycle of the SC stages 1030A-1030N, and three regions 0-2 are shown. The number of power or current spikes 1100 in regions 0, 1, and 2 are, respectively, $k_{m-1}$, $k_m$, and $k_{m+1}$. Because there are different numbers of spikes 1100 in the regions 0-2, it can be assumed that the load demand at the output of the converter 1000 is changing over time, and the stage controller 1010 is turning on and off the SC stages 1030A-1030N accordingly.

In FIG. 11, the phase difference between a Ts period and data sampling by the attacker is θ, and the power consumption at each of the active SC stages 1030A-1030N is $P_0$. To represent the input power information between $mT_s$ and $(m+2)T_s$, an array Am is defined as:

$$A_m = [a_{m,1}, \ldots, a_{m,N}, a_{m,(N+1)}, \ldots, a_{m,2N}]P_0, \quad (2)$$

where $\sum_{i=1}^{N} a_{m,i} = k_m$, $\sum_{i=N+1}^{2N} a_{m,i} = k_{m+1}$ and $a_{m,i} \in \{0,1\}$, ($i=1, 2, \ldots, 2N$). Another array $H_m = [h_1, h_2, \ldots, h_{2N}]$ is defined to represent the monitored power data by the attacker within a switching period with the values $h_i$ as:

$$h_i = \begin{cases} 0, & i \leq [\theta/360 * N] \\ 1, & [\theta/360 * N] < i \leq [\theta/360 * N] + N \\ 0, & i > [\theta/360 * N] + N \end{cases} \quad (3)$$

The input power data $P_{s,m}$ sampled by an attacker within a switch period can then be written as:

$$P_{s,m} = A_m H_m^T. \quad (4)$$

The next step is to enumerate all of the possible arrays $A_m$ and count the number of each sampled power $P_{s,m}$. If the frequency for all the possible sampled power data $P_{s,m}$ is $g_j(\theta, k_m, k_{m+1})$, ($j=1, 2, \ldots, D$) where D is the total number of possible sampled input power data, the corresponding probability $\beta_j(\theta, k_m, k_{m+1})$, ($j=1, 2, \ldots, D$) is:

$$\beta_j(\theta, k_m, k_{m+1}) = \frac{g_j(\theta, k_m, k_{m+1})}{\binom{N}{k_m}\binom{N}{k_{m+1}}}. \quad (5)$$

The PTE value of the converter 1000, $PTE_1$, can be written as:

$$PTE_1 = -\sum_{j=1}^{D} \frac{g_j(\theta, k_m, k_{m+1})}{\binom{N}{k_m}\binom{N}{k_{m+1}}} \log_2 \frac{g_j(\theta,k_m,k_{m+1})}{\binom{N}{k_m}\binom{N}{k_{m+1}}}. \quad (6)$$

To synchronize the attack with the frequency of the converter 1000, an attacker can enter a constant input data to the circuit supplied by power from the converter 1000. Under a constant input sequence, the leakage power consumption within any switching cycle monitored at the input of the converter 1000 would be constant ($k_m = k_{m+1} = \ldots$). By analyzing the power profile with machine learning attacks, the attacker can acquire the switching control signal switching frequency fs and synchronize the attack to have $\theta = 0°$. The PTE value of the converter 1000 becomes zero when the phase difference is $\theta = 0°$ or $360°$, as shown in FIG. 6 and discussed in further detail below.

In view of the problems outlined above, embodiments of time delayed converter reshuffling are described below. The time delayed converter reshuffling techniques can scramble the monitored power consumption so that it will be more difficult for an attacker to extract meaningful information from side channel leakage. In this technique, a number (e.g., an eighth, a quarter, a half, etc.) of the SC stages in a converter are activated through switching control signals gated with a time delay.

Figure 12:
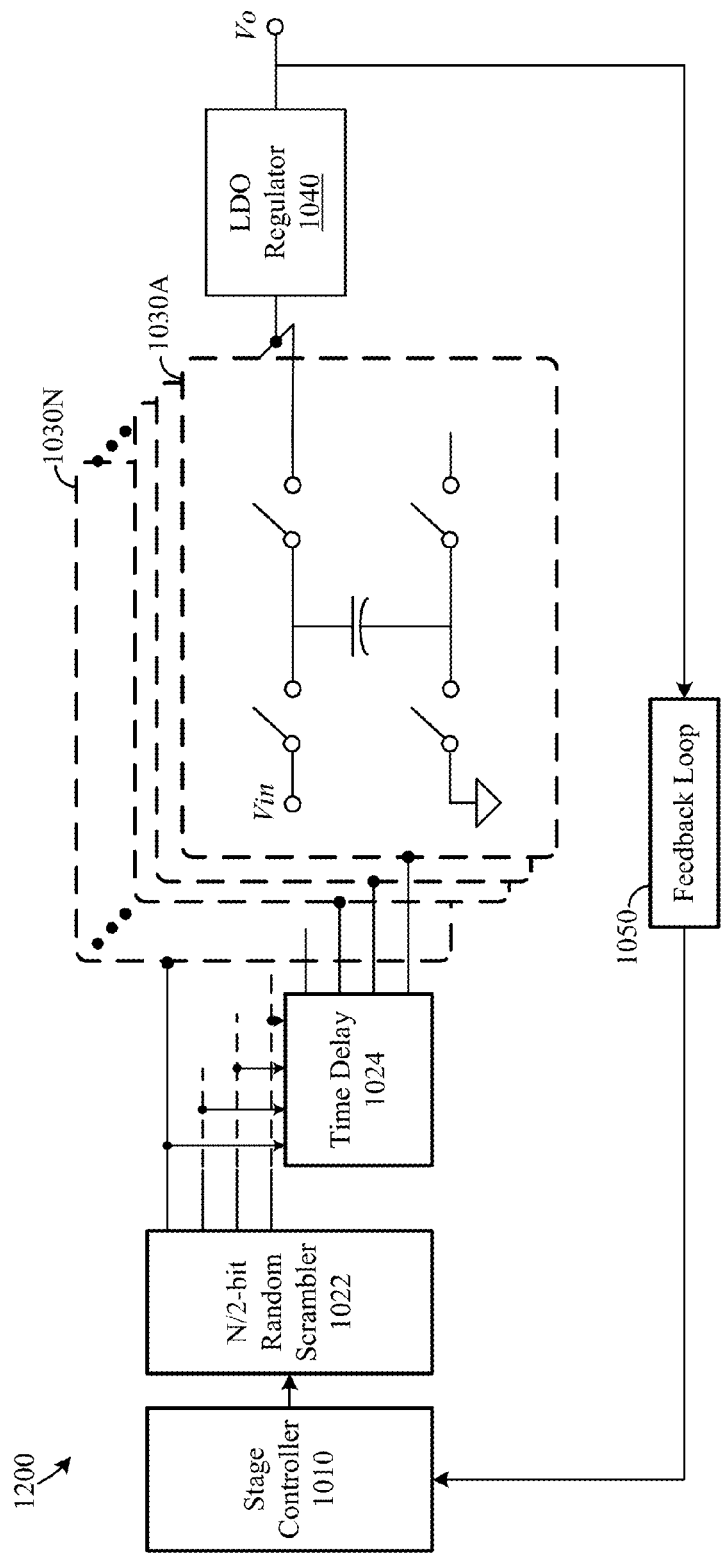
FIG. 12 illustrates an example schematic diagram of a time delayed reshuffling switched capacitor voltage converter according to aspects of the embodiments.

FIG. 12 illustrates an example schematic diagram of a time delayed reshuffling SC converter 1200 according to aspects of the embodiments. The time delayed converter 1200 is similar to the converter 1000 shown in FIG. 10, but also includes the time delay 1024. Additionally, rather than the N-bit random scrambler 1020, the time delayed converter 1200 includes an N/2-bit random scrambler 1022. Thus, in one example embodiment, the N/2-bit random scrambler 1022 and can be embodied, at least in part, as a LFSR-based N/2-bit random or pseudo-random number generator.

As shown, the switching control signals from the N/2-bit random scrambler 1022 are directly coupled to a first subset (e.g., N/2) of the SC stages 1030A-1030N as well as to the time delay 1024. The time delay 1024 is configured to delay the switching control signals before providing them to a second subset (e.g., another N/2) of the SC stages 1030A-1030N. Thus, the reshuffled switching control signals provided to the second subset of the SC stages 1030A-1030N have been delayed in time by the time delay 1024. The time delay 1024 can be embodied as any suitable delay capable of delaying the switching control signals by any suitable amount of time.

The numbers of the SC stages 1030A-1030N in the first and second subsets can vary among embodiments. For example, the time delay 1024 can be applied to switching control signals for one-half, one-quarter, one-eighth, etc. of the SC stages 1030A-1030N. Further, in some embodiments, the time delay 1024 can be applied to different numbers and/or different ones of the SC stages 1030A-1030N over time. Additionally, the amount of the time delay provided by the time delay 1024 can vary over time.

Figure 13:
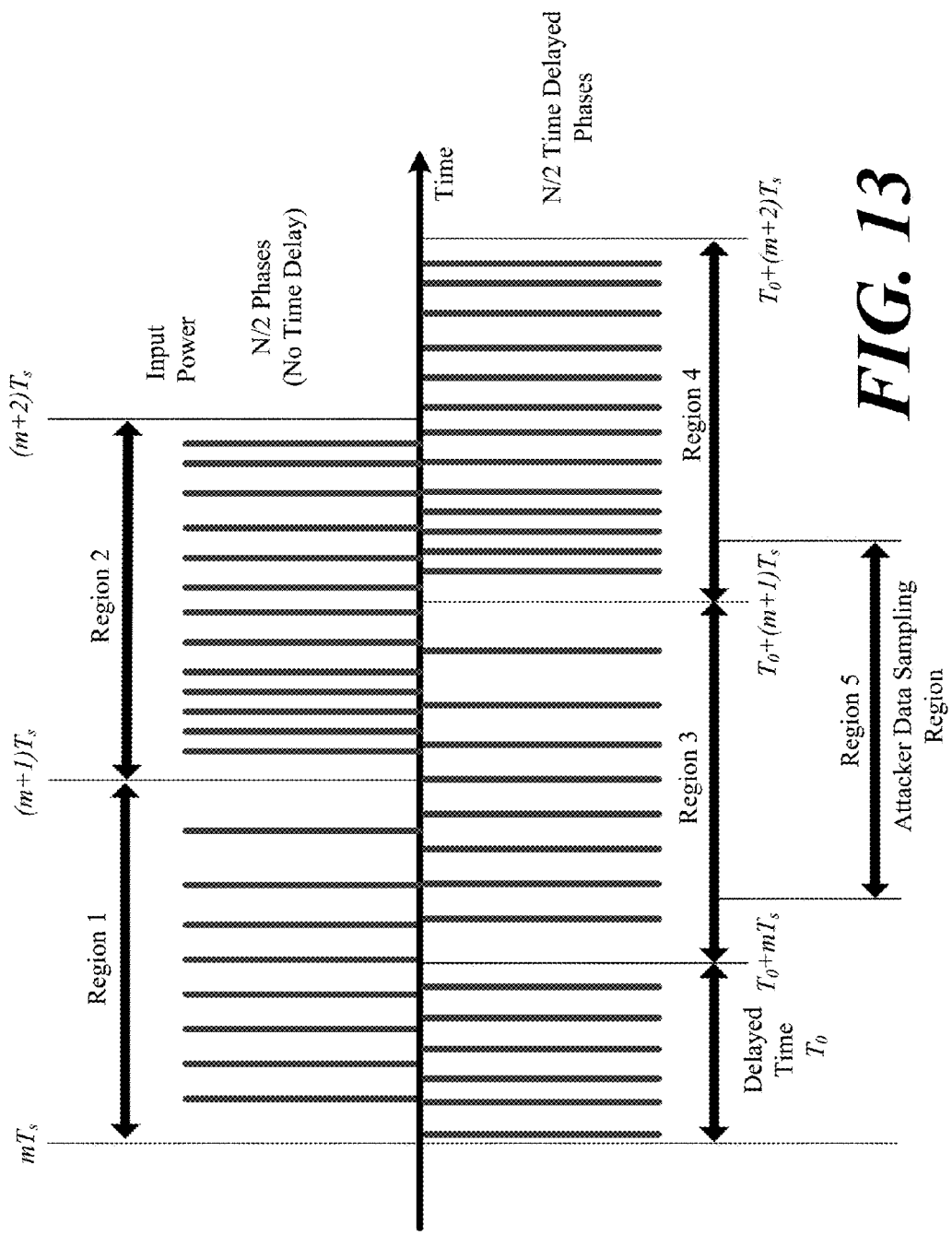
FIG. 13 illustrates an example input power profile to the switched capacitor voltage converter in FIG. 12.

As for modeling, FIG. 13 illustrates an example input power profile to the time delayed converter 1200 in FIG. 12. An array Bm is defined to represent the input power information from $(m-1)T_s$ to $(m+2)T_s$, as shown in FIG. 13, as:

$$B_m = [b_{(m-1),1}, \ldots, b_{(m-1),N/2}, b_{(m-1),N/2+1}, \ldots, \\ b_{(m-1),N}, b_{(m-1),N+1}, \ldots, b_{(m-1),3N/2}]P_0, \quad (7)$$

where $b_{(m-1),i} \in \{0, 1\}$, ($i=1, 2, \ldots, 3N/2$), and $$\left[\sum_{i=1}^{N/2} b_{(m-1),i}, \sum_{i=N/2+1}^{N} b_{(m-1),i}, \sum_{i=N+1}^{3N/2} b_{(m-1),i}\right] = [k_{m-1}/2, k_m/2, k_{m+1}/2]. \quad (8)$$

In the time delayed converter 1200 in FIG. 12, instead of $H_m$, there are two different arrays $Z_m = [z_1, z_2, \ldots, z_{3N/2}]$ and $W_m = [w_1, w_2, \ldots, w_{3N/2}]$ which represent, respectively, the power data monitored by the attacker from the conventional (i.e., not time delayed) N/2 phases and time delayed N/2 phases. Here, $z_i$ and $w_i$ can be written as:

$$z_i = \begin{cases} 0, & i \leq [(\theta/360)*(N/2)] + N/2 \\ 1, & \left[\frac{\theta}{360}*\frac{N}{2}\right] + \frac{N}{2} < i \leq \left[\frac{\theta}{360}*\frac{N}{2}\right] + N, \\ 0, & i > [(\theta/360)*(N/2)] + N \end{cases} \quad (9)$$

$$z_i = \begin{cases} 0, & i \leq [((\theta-\alpha)/360)*(N/2)] + N/2 \\ 1, & \left[\frac{(\theta-\alpha)}{360}*\frac{N}{2}\right] + \frac{N}{2} < i \leq \left[\frac{(\theta-\alpha)}{360}*\frac{N}{2}\right] + N, \\ 0, & i > [((\theta-\alpha)/360)*(N/2)] + N \end{cases} \quad (10)$$

where $\alpha = (T_0/T_s)*360°$ is the delayed phase angle and $T_0$ is the time delay. From the standpoint of a monitoring attacker, the input power data $P'_{s,m}$ of the time delayed converter 120 in a switch period Ts becomes:

$$P'_{s,m} = B_m Z_m^T + B_m W_m^T. \quad (11)$$

The next step is to execute all the possible arrays $B_m$ and count the number of each sampled power $P'_{s,m}$. If the number of all possible sampled input power data is $x_j(\theta, k_{m-1}, k_m, k_{m+1})$, ($j=1, 2, \ldots, E$), where E is the total number of possible sampled input power data, then the probability $\gamma_j(\theta, k_{m-1}, k_m, k_{m+1})$, ($j=1, 2, \ldots, E$) for all the possible input power data $P'_{s,m}$ sampled by the attacker is:

$$\gamma_j(\theta, k_{m-1}, k_m, k_{m+1}) = \frac{x_j(\theta, k_{m-1}, k_m, k_{m+1})}{\binom{N/2}{k_{m-1}/2}\binom{N/2}{k_m/2}\binom{N/2}{k_{m+1}/2}}. \quad (12)$$

The input power trace entropy $PTE_2$ for the time delayed converter 1200 with an N/2 time delay therefore becomes:

$$PTE_2 = -\sum_{j=1}^{E} \gamma_j(\theta, k_{m-1}, k_m, k_{m+1}) \log_2 \gamma_j(\theta,k_{m-1},k_m,k_{m+1}). \quad (13)$$

Figure 14:
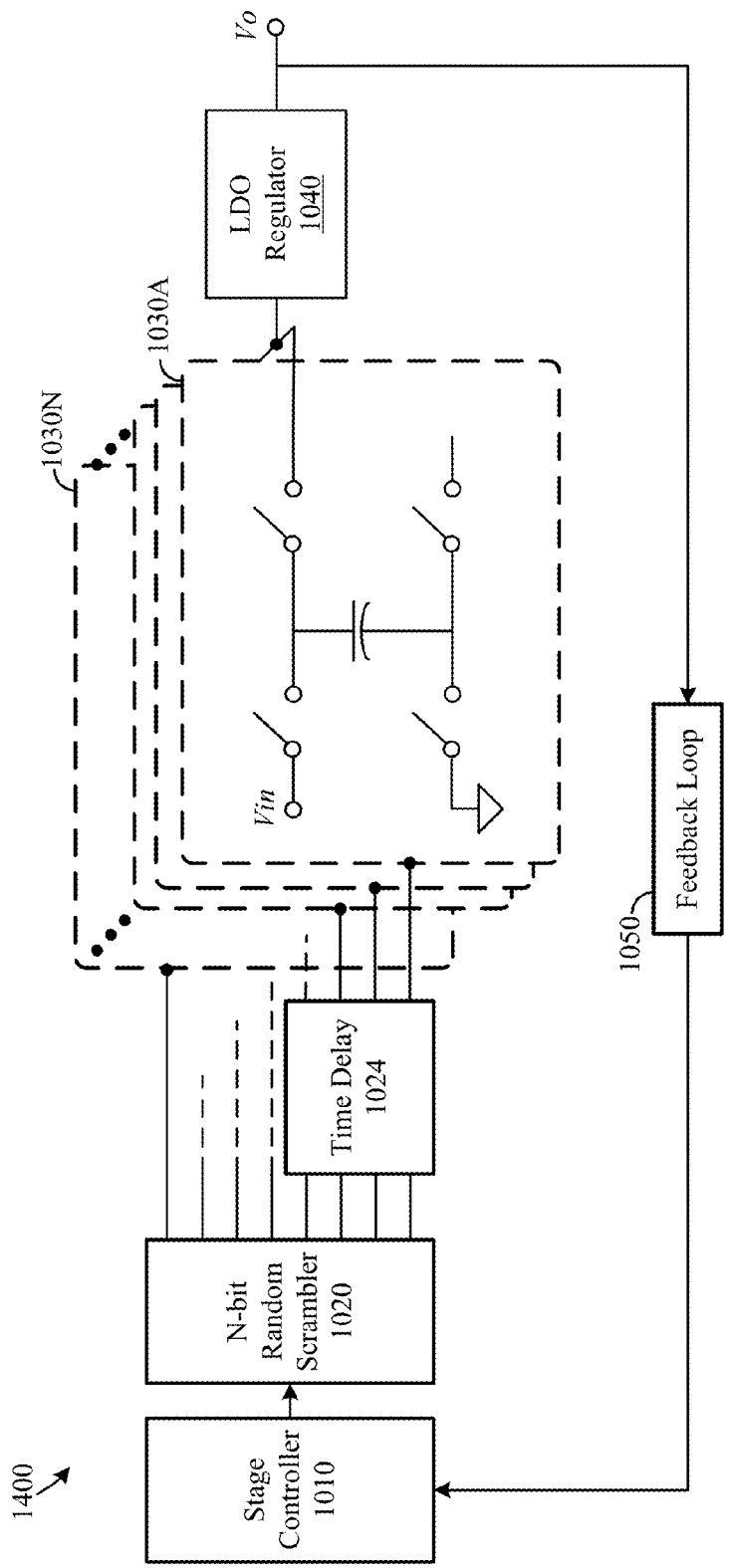
FIG. 14 illustrates an example schematic diagram of another time delayed reshuffling switched capacitor voltage converter according to aspects of the embodiments.

To investigate the effect of the bit length of the random number generated in the N/2 random scrambler 1022 on the entropy level, an N-bit random scrambler can also be used, as shown in FIG. 14.

FIG. 14 illustrates an example schematic diagram of another time delayed reshuffling SC converter 1400 according to aspects of the embodiments. The time delayed converter 1400 is similar to the converter 1200 shown in FIG. 12, but includes the N-bit random scrambler 1020 rather than the N/2-bit random scrambler 1022. Further, a first subset (e.g., N/2) of the switching control signals from the N-bit random scrambler 1020 is directly coupled to a first subset of the SC stages 1030A-1030N. The time delay 1024 is inserted between a second subset (e.g., another N/2) of the switching control signals from the N-bit random scrambler 1020 and a second subset (e.g., other N/2) of the SC stages 1030A-1030N. The time delay 1024 is configured to delay the second subset of switching control signals from the N-bit random scrambler 1020 before providing them to the second subset of the SC stages 1030A-1030N. Thus, the second subset of the reshuffled switching control signals provided to the second subset of the SC stages 1030A-1030N have been delayed in time by the time delay 1024. The time delay 1024 can be embodied as any suitable delay capable of delaying the switching control signals by any suitable amount of time.

The numbers of the SC stages 1030A-1030N in the first and second subsets can vary among embodiments. For example, the time delay 1024 can be applied to switching control signals for one-half, one-quarter, one-eighth, etc. of the SC stages 1030A-1030N. Further, in some embodiments, the time delay 1024 can be applied to different numbers and/or different ones of the SC stages 1030A-1030N over time. Additionally, the amount of the time delay provided by the time delay 1024 can vary over time.

To investigate the effect of the bit length of the random number generated by reshuffling scramblers (e.g., the scramblers 1020 and 1022), $C'_m$ and $C''_m$ arrays are defined to represent the input power information of normal phases and time delayed phases from $(m-1)T_s$ to $(m+2)T_s$, as shown in FIG. 13, and can be written as:

$$C'_m = [c'_{(m-1),1}, \ldots, c'_{(m-1),N/2}, c'_{(m-1),N/2+1}, \ldots, c'_{(m-1),N}, c'_{(m-1),N+1}, \ldots, c'_{(m-1),3N/2}]P_0, \quad (14)$$

$$C''_m = [c''_{(m-1),1}, \ldots, c''_{(m-1),N/2}, c''_{(m-1),N/2+1}, \ldots, c''_{(m-1),N}, c''_{(m-1),N+1}, \ldots, c''_{(m-1),3N/2}]P_0, \quad (15)$$

where $c'_{(m-1),i}, c''_{(m-1),i} \in \{0,1\}$, (i=1, 2, . . . , 3N/2), and $$\left[ \sum_{i=1}^{N/2} (c'_{(m-1),i} + c''_{(m-1),i}), \sum_{i=N/2+1}^{N} (c'_{(m-1),i} + c''_{(m-1),i}), \sum_{i=N+1}^{3N/2} (c'_{(m-1),i} + c''_{(m-1),i}) \right] = [k_{m-1}, k_m, k_{m+1}]. \quad (16)$$

The input power data $P''_{s,m}$ of the time delayed converter 1400 monitored by an attacker within a switching period is:

$$P''_{s,m} = C'_m Z_m^T + C''_m W_m^T. \quad (17)$$

When all possible values of $C'_m$ and $C''_m$ are listed, the frequency $y_j(\theta, k_{m-1}, k_m, k_{m+1})$, (j=1, 2, . . . , F) for each sampled power $P''_{s,m}$ can be determined, where F is the total number of possible sampled input power data. So the corresponding probability $\lambda_j(\theta, k_{m-1}, k_m, k_{m+1})$, (j=1, 2, . . . , F) is:

$$\lambda_j(\theta, k_{m-1}, k_m, k_{m+1}) = \frac{y_j(\theta, k_{m-1}, k_m, k_{m+1})}{\binom{N}{k_{m-1}} \binom{N}{k_m} \binom{N}{k_{m+1}}}. \quad (18)$$

The input power trace entropy $PTE_3$ for the time delayed converter 1400 with an N-bit PRNG is:

$$PTE_3 = -\sum_{j=1}^{F} \frac{y_j(\theta, k_{m-1}, k_m, k_{m+1})}{\binom{N}{k_{m-1}}\binom{N}{k_m}\binom{N}{k_{m+1}}} \log_2 \frac{y_j(\theta, k_{m-1}, k_m, k_{m+1})}{\binom{N}{k_{m-1}}\binom{N}{k_m}\binom{N}{k_{m+1}}}. \quad (19)$$

Figure 15:
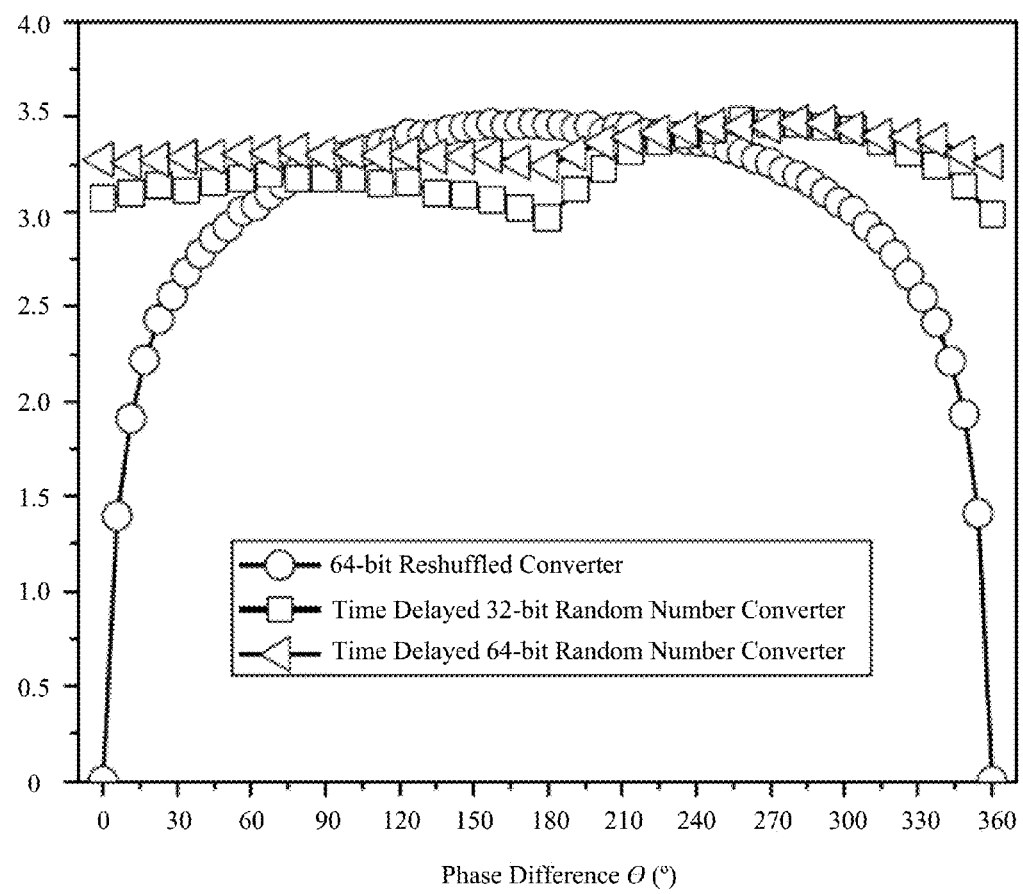
FIG. 15 illustrates power trace entropy values versus phase difference between switching frequency and data sampling frequency for standard, 32-bit time delayed, and 64-bit time delayed reshuffling converters.

PTE values for a standard converter with a 64-bit random scrambler (but no time delay) (e.g., for the converter 1000), for a time delayed converter with a 32-bit random scrambler, and for a time delayed converter with a 64-bit random scrambler are shown in FIG. 15, when the output power dissipation changes from $(N/2)*\eta P_0$ to $(3N/4)*\eta P_0$. Here, N=64 and $\eta$ is the power efficiency. The PTE value for the standard converter becomes zero when the phase difference $\theta$ between switching frequency and data sampling frequency is 0° or 360°. In this case, the standard converter may fail to provide any additional security against DPA attacks if machine learning attacks are used. However, the time delayed converters continuously demonstrate high PTE values (above 3.2) for 0°<$\theta$<360°. Even if the machine learning based DPA attacks can determine the activation/deactivation pattern and synchronize the attack with the converter, there still exists a high amount of uncertainty in the monitored data. This uncertainty is due to withholding charge in some of the converter stages independent of the activation/deactivation pattern. The number of spikes in each switching cycle therefore becomes independent of the workload information and the activation pattern in the proposed technique.

Figure 16:
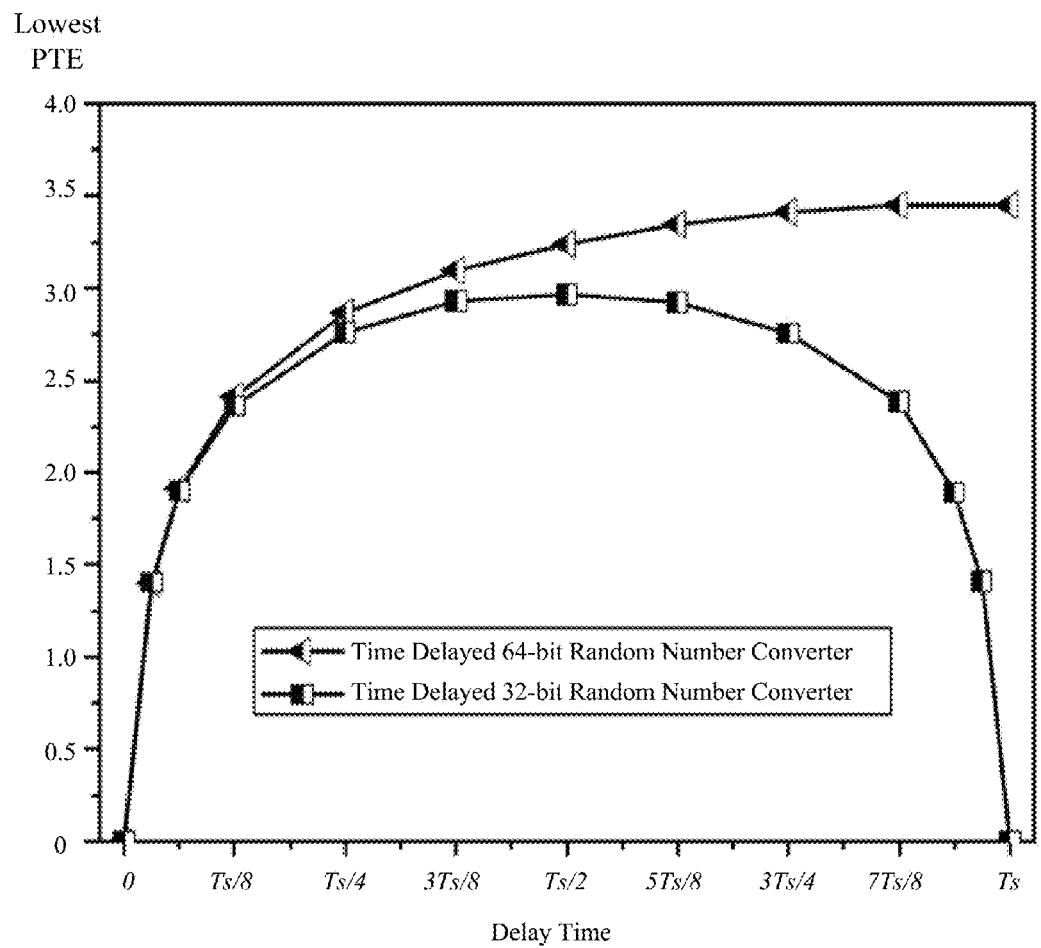
FIG. 16 illustrates lowest power trace entropy value versus time delay in 32-bit and 64-bit time delayed reshuffling converters.

FIG. 16 illustrates lowest power trace entropy value versus time delay in 32-bit and 64-bit time delayed reshuffling converters. The optimum time delay for a time delayed converter with 32-bit random number scrambler is about Ts/2 as shown in FIG. 16. The PTE value of the time delayed converter with a 32-bit random number scrambler, however, approaches zero as the time difference approaches zero or a full period. As shown in FIG. 16, the PTE value for the time delayed converter with a 64-bit random number scrambler increases monotonically with the time delay since both of the N/2 converter stages are controlled by different bits of the random number scrambler. In practical design, the selection of the time delay $T_0$ may also need to meet $$T_0 = n*\left(\frac{2T_2}{N}\right),$$

(n=1, 2, . . . , N/2) to prevent the attacker from splitting the power information of normal phases and time delayed phases.

Figure 17:
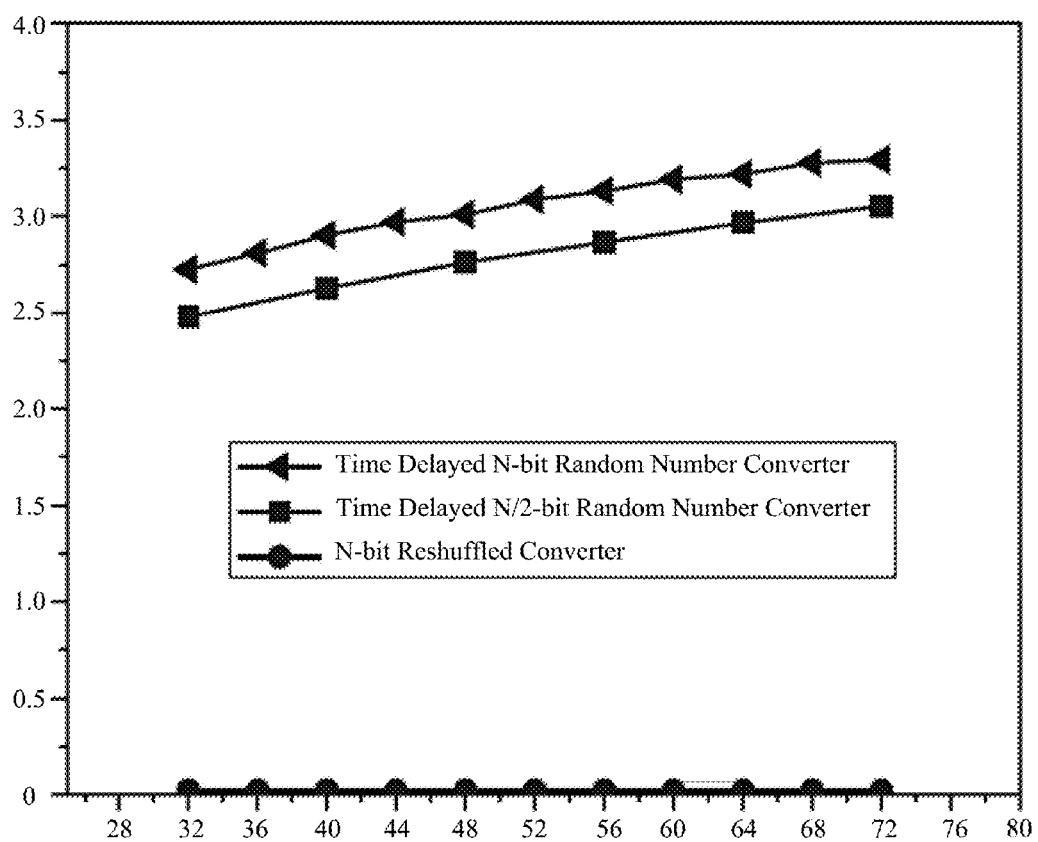
FIG. 17 illustrates lowest power trace entropy value versus the number of phases in 32-bit and 64-bit time delayed reshuffling and standard reshuffling converters.

FIG. 17 illustrates lowest power trace entropy value versus the number of phases in 32-bit and 64-bit time delayed reshuffling and standard reshuffling converters. When the total number of phases N increases, the lowest PTE value of the standard reshuffling converter always maintains at zero, while the lowest PTE value of the time delayed reshuffling converters monotonically increase due to higher random entropy, as shown in FIG. 17. The time delayed reshuffling converters therefore become even more effective against machine learning based DPA attacks as the number of converter stages increase.

Figure 18:
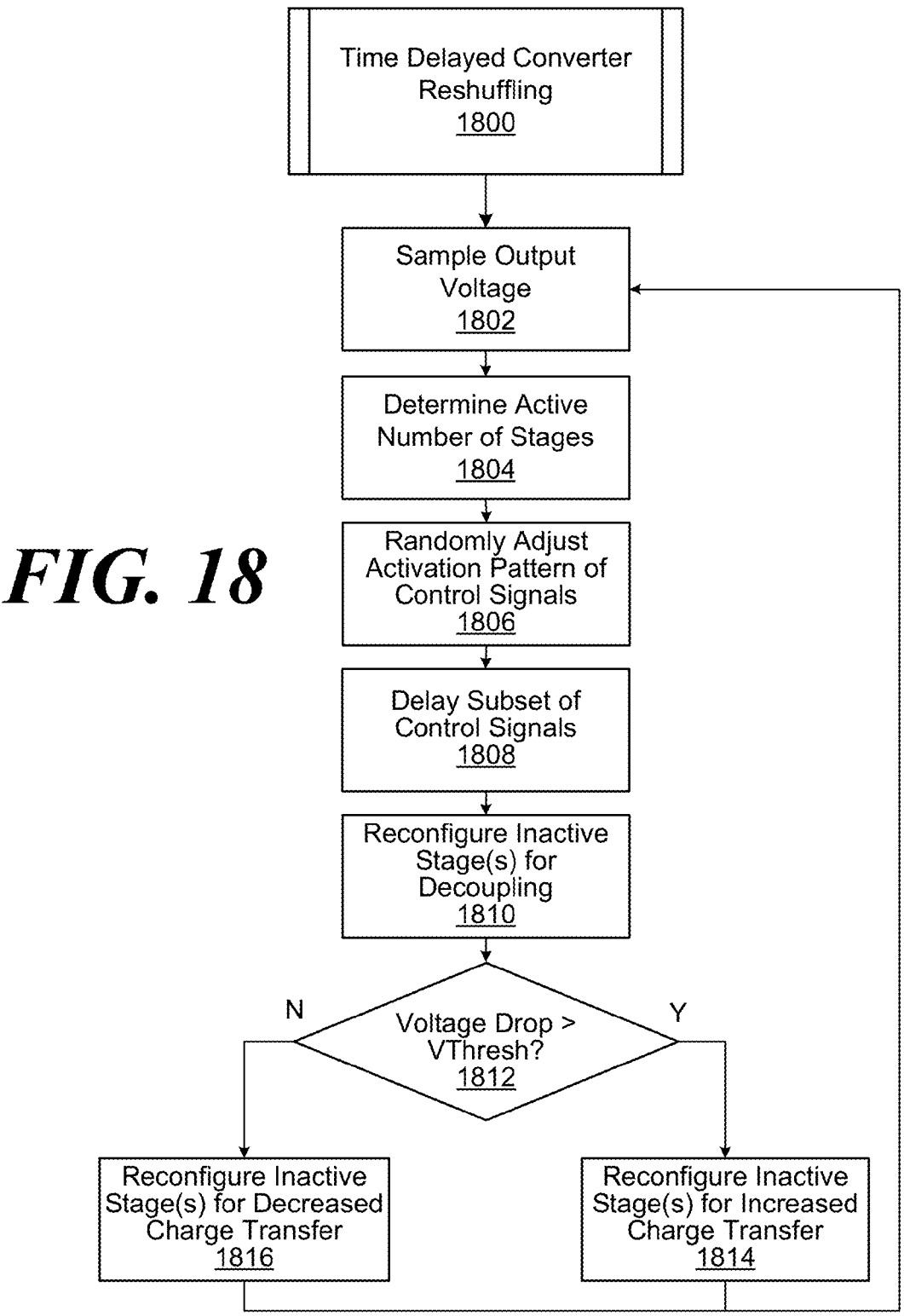
FIG. 18 illustrates an example process for time delayed converter reshuffling performed by the converters shown in FIGS. 12 and 14 according to aspects of the embodiments.

FIG. 18 illustrates an example process 1800 for time delayed converter reshuffling performed by the converters shown in FIGS. 12 and 14 according to aspects of the embodiments. The process 1800 is described with reference to the converters 1200 and 1400. However, other switched capacitor voltage converters consistent with the embodiments described herein can perform the process 1800.

At step 1802, the process 1800 includes sampling the output voltage Vo. For example, as described above, the first feedback loop 1050 of either the converters 1200 or 1400 can provide a signal representative of the output voltage Vo to the stage controller 1010. At step 1804, the process 1800 includes the stage controller 1010 determining an active number of the SC stages 1030A-1030N or a number of the SC stages 1030A-1030N to be activated. According to the concepts described herein, the stage controller 1010 can determine the active number of stages based on one or more operating characteristics, such as the load demand, the output voltage Vo, etc. The determination of the active number of stages is dynamic and ongoing in the process 1800. Thus, at step 1804, if the operating characteristics change, the active number of the SC stages 1030A-1030N can be increased or decreased over time. The increase or decrease can be by one stage, two stages, or any suitable number of stages.

At step 1806, the process 1800 includes the random scrambler 1020 or the random scrambler 1022 randomly adjusting an activity pattern for control signals provided to the SC stages 1030A-1030N based on the number of stages determined at step 1804 to be active. For example, when five of eight of the SC stages 1030A-1030N are active, the phases of these active stages can be configured as (0°, 45°, 90°, 135° and 180°) or (0°, 90°, 180°, 225°, and 270°) (56 different combinations exist for this case). These different converter-gating activation patterns lead to varying current spikes in the input power profile.

At step 1808, the process 1800 includes delaying at least a subset of the switching control signals provided to the SC stages 1030A-1030N. For example, the time delay 1024 can delay switching control signals provided by either of the random scrambler 1020 or 1022 before providing them to a subset of the SC stages 1030A-1030N, as described above with reference to FIGS. 12 and 14.

At step 1810, the process 1800 includes the stage controller 1010 reconfiguring at least one of the SC stages 330A-330N that is inactive to provide a decoupling capacitor at the output. Consistent with the concepts described herein, the reconfiguring can be performed based on the decoupling described with reference to FIG. 7.

At step 1812, the process 1800 includes determining whether an output voltage has dropped by more than a predetermined amount below a desired output voltage Vo. For example, when transient load changes that result in more than a threshold voltage drop VThresh (e.g., 30 mV, 60 mV, 120 mV, etc.) are detected in the output voltage Vo through feedback, the process 1800 proceeds to step 1814. Otherwise, the process 1800 proceeds to step 1816.

At step 1814, the process 1800 includes the stage controller 1010 reconfiguring at least one of the SC stages 1030A-1030N that is active to increase its charge transfer ratio. The charge transfer ratio can be increased by reconfiguring active stages from 2:1 switched capacitor stages to 1:1 switched capacitor stages, as described above with reference to FIG. 4. In that way, the charge transfer ratio can be increased for at least a limited number of cycles or period of time until the desired output voltage Vo is stabilized.

At step 1816, the process 1800 includes the stage controller 1010 reconfiguring one or more of the active SC stages 330A-330N from 1:1 switched capacitor stages back to 2:1 switched capacitor stages, as described above with reference to FIG. 4. In that way, the output ripple of the converter 300 can be decreased while the demand for load current is constant and/or the output voltage Vo is stabilized.

The stage controllers 310 and 1010 and the random scramblers 320, 1020, and 1022, for example, among other components of the converters described herein, can include at least one processor, processing circuit or circuitry, or any combination thereof (i.e., control logic), with or without separate memory, local interfaces, etc. The local interface can be embodied as any suitable data bus with an accompanying address/control bus or other addressing, control, and/or command lines. To the extent needed based on the type of implementation, the memory stores software, executable-code components, and/or instructions executable by the processing circuitry that, when executed, direct the circuitry to perform various aspects of the embodiments. Where any component discussed herein is implemented, at least in part, in the form of software or, any one of a number of programming languages can be employed, such as, for example, C, C++, C#, Objective C, or other programming languages.

In various embodiments, a memory in the stage controllers 310 and 1010 (and/or the random scramblers 320, 1020, and 1022) can store software for execution. In this respect, the terms "executable" or "for execution" refer to software forms that can ultimately be run or executed by the processor and/or processing circuitry, whether in source, object, machine, or other form. Examples of executable programs include, for example, a compiled program that can be translated into a machine code format and executed by the processor, source code that can be expressed in an object code format and executed by the processor, source code that can be interpreted by another executable program to generate instructions executed by the processor, etc.

The memory can be embodied as any physical computer-readable medium, such as magnetic, optical, or semiconductor media. More specific examples of computer-readable media include, but are not limited to, magnetic tapes, magnetic floppy diskettes, magnetic hard drives, memory cards, solid-state drives, USB flash drives, or optical discs. Also, the computer-readable media can include a RAM, such as an SRAM, DRAM, MRAM, ROM, PROM, EPROM, EEPROM, or other similar memory device.

The flowchart or process diagrams in FIGS. 9 and 18 are representative of certain processes, functionality, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system. Additionally or alternatively, each block can represent, or be connected with, a circuit or a number of interconnected circuits to implement a certain logical function or process step.

Although the flowchart or process diagram in FIGS. 9 and 18 illustrate a specific order, it is understood that the order can differ from that which is depicted. For example, an order of execution of two or more blocks can be scrambled relative to the order shown. Also, two or more blocks shown in succession in FIGS. 9 and 18 can be executed concurrently or with partial concurrence. Further, in some embodiments, one or more of the blocks shown in FIGS. 9 and 18 can be skipped or omitted. In addition, any number of counters, state variables, warning semaphores, or messages might be added to the logical flow described herein, for purposes of enhanced utility, accounting, performance measurement, or providing troubleshooting aids, etc. All such variations are within the scope of the present disclosure.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phases are not generally intended to, and should not, imply that certain embodiments require at least one of either X, Y, or Z to be present, but not, for example, one X and one Y. Further, such phases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the invention defined in the following claims, the scope of which are to be accorded the broadest interpretation so as to encompass modifications and equivalent structures.

The invention claimed is:

1. A switched capacitor voltage converter, comprising:
   a plurality of switched capacitor stages configured to provide power from a power source to a circuit load;
   a feedback loop electrically coupled to an output of the plurality of switched capacitor stages;
   stage control logic configured to determine an active number of the plurality of switched capacitor stages based on an output signal from the feedback loop;
   scrambling logic configured to randomly adjust an activity pattern for control signals provided to the plurality of switched capacitor stages based on the active number of the plurality of switched capacitor stages to disrupt a correlation between the power provided from the power source to the circuit load; and
   time delay logic configured to delay at least a subset of the control signals provided to the plurality of switched capacitor stages.

2. The switched capacitor voltage converter of claim 1, wherein:
   the scrambling logic comprises an N-bit random scrambler, wherein N is a number of the plurality of switched capacitor stages;
   a first subset of the control signals is provided to a first subset of the plurality of switched capacitor stages;
   the time delay logic delays a second subset of the control signals to provide a delayed subset of control signals; and
   the delayed subset of control signals is provided to a second subset of the plurality of switched capacitor stages.

3. The switched capacitor voltage converter of claim 1, wherein:
   the scrambling logic comprises an N/2-bit random scrambler, wherein N is a number of the plurality of switched capacitor stages;
   the control signals are provided to a first subset of the plurality of switched capacitor stages;
   the time delay logic delays the control signals to provide a delayed subset of control signals; and
   the delayed subset of control signals is provided to a second subset of the plurality of switched capacitor stages.

4. The switched capacitor voltage converter of claim 3, wherein the scrambling logic comprises an N/P-bit random scrambler, wherein N is a number of the plurality of switched capacitor stages and P is a multiple of 2.

5. The switched capacitor voltage converter of claim 1, wherein the time delay logic increases a power trace entropy (PTE) of an input power profile of the switched capacitor voltage converter.

6. The switched capacitor voltage converter of claim 1, further comprising a low dropout regulator coupled to an output of the plurality of switched capacitor stages.

7. The switched capacitor voltage converter of claim 1, wherein the stage control logic is further configured to adjust the active number of the plurality of switched capacitor stages based on a load demand.

8. The switched capacitor voltage converter of claim 1, wherein the stage control logic is further configured to:
   reconfigure at least one of the plurality of switched capacitor stages that is inactive to provide a decoupling capacitor at an output of the switched capacitor voltage converter; and
   reconfigure at least one of the plurality of switched capacitor stages to increase a charge transfer ratio of the switched capacitor voltage converter.

9. A method of providing power from a power source to a circuit load using a switched capacitor voltage converter, comprising:
   sampling, through a feedback loop, an output voltage of the switched capacitor voltage converter provided to the circuit load, the switched capacitor voltage converter having a plurality of switched capacitor stages;
   determining an active number of the plurality of switched capacitor stages based on the output voltage;
   randomly adjusting, by scrambling logic, an activity pattern for control signals provided to the plurality of switched capacitor stages based on the active number of the plurality of switched capacitor stages to disrupt a correlation between the power provided from the power source to the circuit load; and
   delaying at least a subset of the control signals provided to the plurality of switched capacitor stages.

10. The method of claim 9, wherein:
    a first subset of the control signals is provided to a first subset of the plurality of switched capacitor stages;
    the delaying comprises delaying a second subset of the control signals to provide a delayed subset of control signals; and
    the delayed subset of control signals is provided to a second subset of the plurality of switched capacitor stages.

11. The method of claim 9, wherein:
    the control signals are provided to a first subset of the plurality of switched capacitor stages;
    the delaying comprises delaying the control signals to provide a delayed subset of control signals; and
    the delayed subset of control signals is provided to a second subset of the plurality of switched capacitor stages.

12. The method of claim 9, wherein the scrambling logic comprises an N/P-bit random scrambler, wherein N is a number of the plurality of switched capacitor stages and P is a multiple of 2.

13. The method of claim 9, wherein the delaying increases a power trace entropy (PTE) of an input power profile of the switched capacitor voltage converter.

14. The method of claim 9, further comprising reconfiguring at least one of the plurality of switched capacitor stages that is inactive to provide a decoupling capacitor at an output of the switched capacitor voltage converter.

15. The method of claim 9, further comprising reconfiguring at least one of the plurality of switched capacitor stages to increase a charge transfer ratio of the switched capacitor voltage converter.

16. A switched capacitor voltage converter, comprising:
a plurality of switched capacitor stages;
stage control logic configured to determine an active number of the plurality of switched capacitor stages;
scrambling logic configured to randomly adjust an activity pattern for control signals provided to the plurality of switched capacitor stages based on the active number of the plurality of switched capacitor stages; and
time delay logic configured to delay at least a subset of the control signals provided to the plurality of switched capacitor stages, wherein the time delay logic increases a power trace entropy (PTE) of an input power profile of the switched capacitor voltage converter.

17. The switched capacitor voltage converter of claim 16, wherein the scrambling logic comprises an N/P-bit random scrambler, wherein N is a number of the plurality of switched capacitor stages and P is a multiple of 2.

18. The switched capacitor voltage converter of claim 16, wherein:
the scrambling logic comprises an N-bit random scrambler, wherein N is a number of the plurality of switched capacitor stages;
a first subset of the control signals is provided to a first subset of the plurality of switched capacitor stages;
the time delay logic delays a second subset of the control signals to provide a delayed subset of control signals; and
the delayed subset of control signals is provided to a second subset of the plurality of switched capacitor stages.

19. The switched capacitor voltage converter of claim 16, wherein:
the scrambling logic comprises an N/2-bit random scrambler, wherein N is a number of the plurality of switched capacitor stages;
the control signals are provided to a first subset of the plurality of switched capacitor stages;
the time delay logic delays the control signals to provide a delayed subset of control signals; and
the delayed subset of control signals is provided to a second subset of the plurality of switched capacitor stages.

20. The switched capacitor voltage converter of claim 19, wherein the stage control logic is further configured to:
reconfigure at least one of the plurality of switched capacitor stages that is inactive to provide a decoupling capacitor at an output of the switched capacitor voltage converter; and
reconfigure at least one of the plurality of switched capacitor stages to increase a charge transfer ratio of the switched capacitor voltage converter.

* * * * *